United States Patent
Zhang et al.

(10) Patent No.: US 8,908,562 B2
(45) Date of Patent: Dec. 9, 2014

(54) METHOD FOR REMOTELY MANAGING A SENSOR NETWORK TOPOLOGY AND GATEWAY

(71) Applicant: Huawei Technologies Co., Ltd., Shenzhen, Guangdong (CN)

(72) Inventors: Yongjing Zhang, Nanjing (CN); Yonggang Bian, Nanjing (CN); Cheng Huang, Shenzhen (CN); Chuansuo Ding, Nanjing (CN); Lei Jin, Nanjing (CN); Lunjian Mu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 13/872,968

(22) Filed: Apr. 29, 2013

(65) Prior Publication Data
US 2013/0294285 A1    Nov. 7, 2013

Related U.S. Application Data

(63) Continuation of application No. PCT/CN2011/074608, filed on May 24, 2011.

(30) Foreign Application Priority Data

Oct. 27, 2010    (CN) .......................... 2010 1 0527473

(51) Int. Cl.
*H04L 12/24* (2006.01)
*H04W 88/16* (2009.01)
(Continued)

(52) U.S. Cl.
CPC .............. *H04L 41/08* (2013.01); *H04W 24/02* (2013.01); *H04W 84/18* (2013.01); *H04W 88/16* (2013.01); *H04W 4/001* (2013.01); *H04L 41/12* (2013.01); *H04W 4/005* (2013.01)
USPC ....................................... 370/254

(58) Field of Classification Search
CPC ........................................... H04L 41/08
USPC ........................... 370/254; 709/223
See application file for complete search history.

(56) References Cited

U.S. PATENT DOCUMENTS

2007/0189190 A1    8/2007  Feng et al.
2008/0189404 A1*   8/2008  He et al. .............. 709/223
(Continued)

FOREIGN PATENT DOCUMENTS

CN    1547357 A  *  11/2004
CN    101123785 A     2/2008
(Continued)

OTHER PUBLICATIONS

Srdjan Krco,Bluetooth Based Wireless Sensor Networks—Implementation Issues and Solutions, ,Applied Research Lab, Ericsson Ireland, 2002.*

(Continued)

*Primary Examiner* — Khaled Kassim
*Assistant Examiner* — Parth Patel
(74) *Attorney, Agent, or Firm* — Huawei Technologies Co., Ltd.

(57) ABSTRACT

A method for remotely managing a sensor network topology includes: receiving a device management DM command sent by a device management server, where the DM command acts on a preconstructed management object MO node and the MO node includes a node configured to discover a sensor network topology, a node configured to describe a sensor network topology, or a node configured to modify a sensor network topology; and managing a sensor network according to the DM command, where the management includes discovering the sensor network topology, describing the sensor network topology, or modifying the sensor network topology. By adopting the present invention, remote topology management of a sensor network successive to an M2M gateway can be implemented and the complexity for implementing the management is reduced.

16 Claims, 15 Drawing Sheets

A gateway receives a DM command sent by a device management server, where the DM command acts on a preconstructed MO node and the MO node includes a node configured to discover a sensor network topology, a node configured to describe the sensor network topology, or a node configured to modify the sensor network topology ~11

The gateway manages the sensor network according to the DM command, where the management includes discovering the sensor network topology, describing the sensor network topology, or modifying the sensor network topology ~12

(51) Int. Cl.
*H04W 4/00* (2009.01)
*H04W 24/02* (2009.01)
*H04W 84/18* (2009.01)

(56) References Cited

U.S. PATENT DOCUMENTS

2008/0215668 A1  9/2008  Hu
2011/0231538 A1  9/2011  He et al.

FOREIGN PATENT DOCUMENTS

| CN | 101222397 | A |   | 7/2008  |          |
|----|-----------|---|---|---------|----------|
| CN | 101313512 | A |   | 11/2008 |          |
| CN | 100499494 | C |   | 6/2009  |          |
| CN | 101667926 | A | * | 3/2010  | H04L 12/24 |
| CN | 101854343 | A |   | 10/2010 |          |
| EP | 2051440   | A1|   | 4/2009  |          |
| WO | 2009102390| A2|   | 8/2009  |          |

OTHER PUBLICATIONS

Second office action issued in corresponding Chinese patent application 201010527473.9, dated May 29, 2013, and English translation thereof, total 22 pages.
Written Opinion issued in corresponding PCT application No. PCT/CN2011/074608, dated Sep. 8, 2011, total 3 pages.
Search report issued in corresponding PCT application No. PCT/CN2011/074608, dated Sep. 8, 2011, total 3 pages.
First office action issued in corresponding Chinese patent application 201010527473.9, dated Oct. 23, 2012, and English translation thereof, total 11 pages.
OMA :"White paper on M2M standardization", Oct. 29, 2010, total 29 pages.
OMA :"Converged personal network service architecture", Jun. 15, 2010, total 34 pages.
Fujitsu et al. :"OMA-DM M2M considerations", May 2, 2011, total 23 pages.
LGE :"Group Management in GwMO", OMA-DM-GwMO-2010-0034, Aug. 27, 2010, total 12 pages.
OMA :"Open mobile alliance", candidate version 1.0, Aug. 31, 2010, total 15 pages.

* cited by examiner

METHOD FOR REMOTELY MANAGING A SENSOR NETWORK TOPOLOGY AND GATEWAY

CROSS-REFERENCE TO RELATED APPLICATIONS

This application is a continuation of International Application No. PCT/CN2011/074608, filed on May 24, 2011, which claims priority to Chinese Patent Application No. 201010527473.9, filed on Oct. 27, 2010, both of which are hereby incorporated by reference in their entireties.

FIELD OF THE INVENTION

The present invention relates to the communications technologies, and in particular, to a method for remotely managing a sensor network topology and a gateway.

BACKGROUND OF THE INVENTION

The machine-to-machine communications (Machine-to-Machine Communications, M2M) is a type of networked application and service with machine-to-machine intelligent interactions being the core. The M2M communications implements data communications without human intervention by embedding wireless or wired communication modules and application processing logic in machines, so as to satisfy user's informatization requirements in the aspects such as detecting, directing and dispatching, and data collection and measurement. A conventional M2M system architecture includes M2M terminals, an M2M gateway, an M2M service platform, and an M2M application platform, where the M2M terminals may be a sensor, a microcontroller, and the like. The M2M terminals are connected to the M2M gateway by using the technology of stub sensor network (for example, the ZigBee and the BlueTooth) and further connected to the M2M service platform through the M2M gateway using a remote access technology (for example, a 2G/3G wireless cellular network). Moreover, all types of M2M application platform (for example, electric meter reading and intelligent traffic) acquire, through the M2M service platform, data collected by the M2M terminals, or remotely control and manage the M2M terminals in a sensor network.

The management of a remote device is an important function of an M2M system, that is, the M2M application platform or an M2M service provider is required to perform daily management and maintenance of the M2M terminals in the stub sensor network remotely through the M2M service platform and the M2M gateway. Because the stub sensor network generally performs networking in a self-organized manner, sometimes, it is difficult to predict a network topology and a working status of a device. Therefore, an administrator needs to discover a topology to adjust the topology. The topology discovery is to find which devices are contained in the sensor network and the communication connection relationships among the devices through a remote network topology management function. The topology adjustment is to perform proper manual adjustment when necessary.

In the prior art, remote device management technologies based on a wide area network mainly include the device management (Device Management, DM) regulations defined by the Open Mobile Alliance (OMA). The technology can implement remote management for the M2M gateway through operating management object (Management Object, MO) data on the M2M gateway, but still does not support remote topology management for a stub sensor network through the M2M gateway. In another aspect, in the field of sensor networks, the ZigBee gateway device regulations define a technology of remote network management based on an Internet protocol (Internet Protocol, IP) bearer. The technology can provide a simple remote ZigBee network device and an operation method for service discovery rather than directly provide topology information of the sensor network and a topology adjustment method. The above function can only be implemented by further combining other ZigBee management commands, where the operation method is complicated. Other sensor network protocols (for example, the BlueTooth) do not provide a method for remotely managing a topology through a gateway.

In the prior art, no solution is provided for remote topology management of a sensor network successive to an M2M gateway or the management is difficult and complicated.

SUMMARY OF THE INVENTION

Embodiments of the present invention provide a method for remotely managing a sensor network topology and a gateway, so as to implement remote topology management for a sensor network successive to an M2M gateway, thereby reducing the complexity of implementing the management.

An embodiment of the present invention provides a method for remotely managing a sensor network topology, including:

receiving a DM command sent by a device management server, where the DM command acts on a preconstructed MO node and the MO node includes a node configured to discover a sensor network topology, a node configured to describe a sensor network topology, or a node configured to modify a sensor network topology; and managing a sensor network according to the DM command, where the managing includes discovering the sensor network topology, describing the sensor network topology, or modifying the sensor network topology.

An embodiment of the present invention provides a gateway, including:

a receiving module, configured to receive a DM command sent by a device management server, where the DM command acts on a preconstructed MO node and the MO node includes a node configured to discover a sensor network topology, a node configured to describe a sensor network topology, or a node configured to modify a sensor network topology; and a management module, configured to manage a sensor network according to the DM command, where the management includes discovering the sensor network topology, describing the sensor network topology, or modifying the sensor network topology.

It can be seen from the above technical solutions that, in the method for remotely managing a sensor network topology and the gateway in the embodiments of the present invention, a DM command is received through information of a preconstructed topology and a uniform management interface (that is, a DM protocol interface) consistent with the existing remote device management technologies is used, so that an M2M service platform (or other device management servers) can perform remote topology management and maintenance not only on the M2M gateway, but also on a sensor network connected to the M2M gateway, thereby reducing the complexity of implementing the management.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art can derive other drawings from these accompanying drawings without creative efforts.

DETAILED DESCRIPTION OF THE EMBODIMENTS

To make the objectives, technical solutions, and advantages of the present invention more comprehensible, the following clearly and completely describes the technical solutions according to the embodiments of the present invention with reference to the accompanying drawings in the embodiments of the present invention. Apparently, the embodiments in the following description are merely a part of rather than all the embodiments of the present invention. All other embodiments obtained by persons of ordinary skill in the art based on the embodiments of the present invention without creative efforts shall fall within the protection scope of the present invention.

Figure 1:
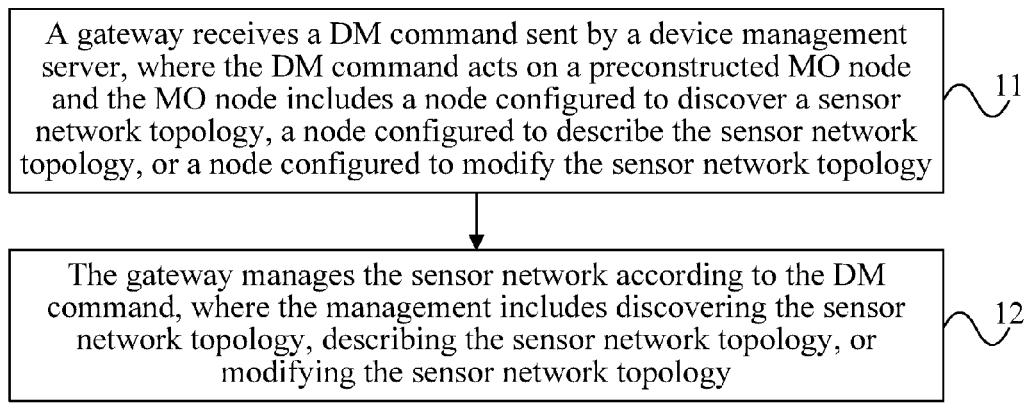
FIG. 1 is a schematic flow chart of a method according to Embodiment 1 of the present invention.

FIG. 1 is a schematic flow chart of a method according to Embodiment 1 of the present invention. The method includes the following steps:

Step 11: A gateway receives a DM command sent by a device management server, where the DM command acts on a preconstructed MO node and the MO node includes a node configured to discover a sensor network topology, a node configured to describe a sensor network topology, or a node configured to modify a sensor network topology.

Figure 2:
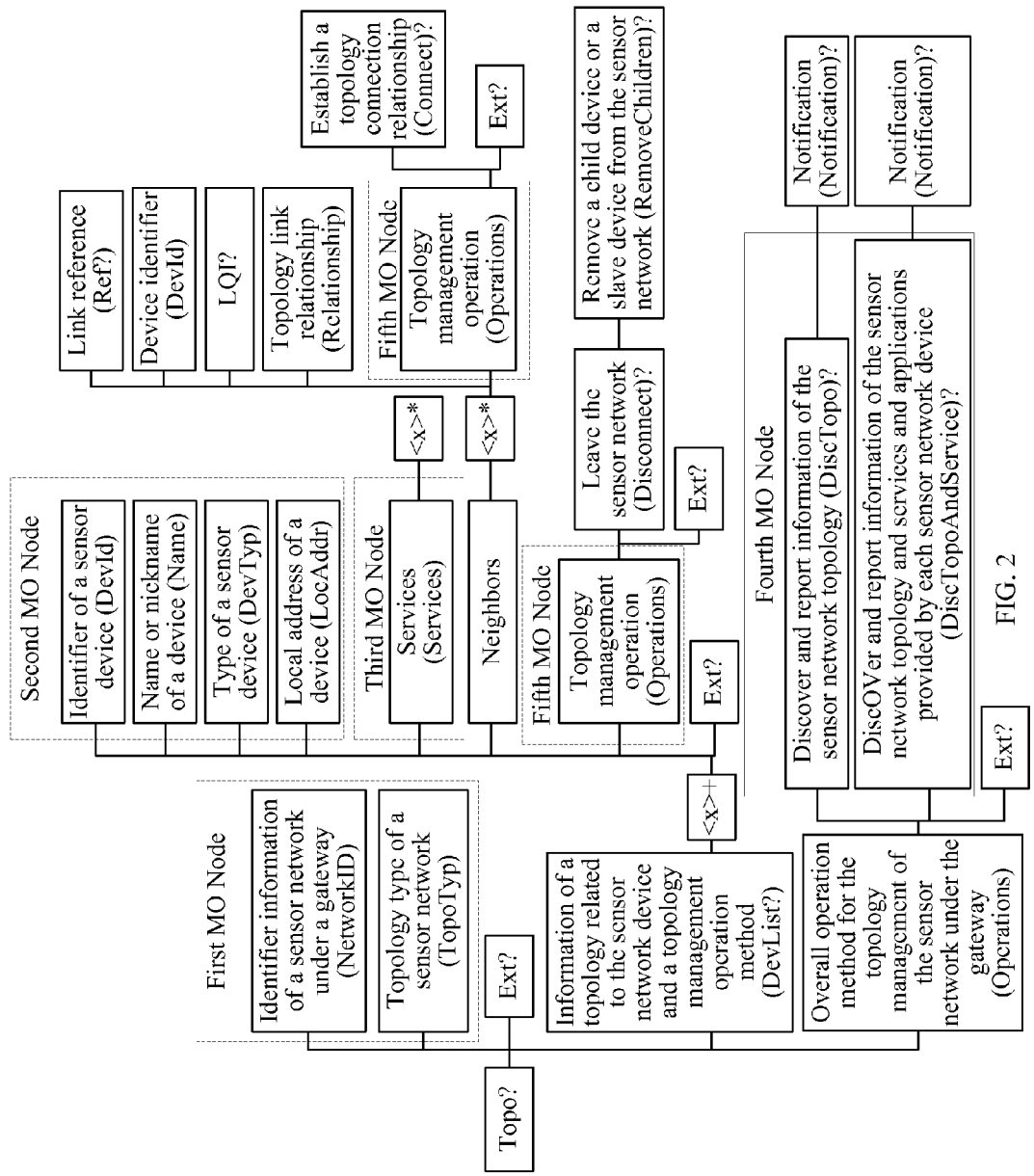
FIG. 2 is a tree-like MO structural model for implementing remote management of a sensor network topology according to an embodiment of the present invention.

The node configured to describe a sensor network topology includes at least one of:

a first MO node configured to describe overall information of the sensor network, in which, for example, referring to the topology tree shown in FIG. 2, the first MO node includes at least one of: Topo/NetworkId and Topo/TopoTyp;

a second MO node configured to describe characteristic information of each sensor device and/or information of a topology connection relationship among the sensor devices, in which, for example, referring to the topology tree shown in FIG. 2, the second MO node includes at least one of: Topo/DevList/<x>/DevId, Topo/DevList/<x>/Name, Topo/DevList/<x>/DevTyp, Topo/DevList/<x>/LocAddr, and Topo/DevList/<x>/Neighbors (of course, it can be understood that a child node "Operations" under "Neighbors" is not included); and a third MO node configured to describe information about a service provided by each sensor device, in which, for example, referring to the topology tree shown in FIG. 2, the third MO node includes the following item: Topo/DevList/<x>/Service (of course, it can be understood that the child node "Operations" under "Neighbors" is not included).

The node configured to discover the sensor network topology includes:

a fourth MO node configured to discover the topology connection relationship among the sensor devices and/or the information about a service provided by each sensor device, in which, for example, referring to the topology tree shown in FIG. 2, the fourth MO node includes at least one of: Topo/Operations/DiscTopo and Topo/Operations/DiscTopoAndServices.

The node configured to modify a sensor network topology includes at least one of:

a fifth MO node configured to modify the topology connection relationship among the sensor devices, in which, for example, referring to the topology tree shown in FIG. 2, the fifth MO node includes at least one of: Topo/DevList/<x>/Operations and Topo/DevList/<x>/Neighbors/<x>/Operations; and a sixth MO node configured to modify the information about a service provided by the sensor devices, in which, for example, referring to the topology tree shown in FIG. 2, the sixth MO node includes the following item: Topo/DevList/<x>/Services/<x>/Operations.

Furthermore, this embodiment may also include:

constructing a topology tree, where the topology tree is composed of a plurality of MO nodes.

The constructed topology tree is shown in FIG. 2. FIG. 2 is a tree-like MO structural model for implementing remote management of a sensor network topology in the embodiment of the present invention, where each block indicates one MO node or its one child node in a management tree. For the sake of conciseness, FIG. 2 does not list information of all nodes in the management tree, but only lists the information of nodes closely related to the embodiment of the present invention.

It should be noted that, different symbols may be marked after node names in the node blocks, which are as follows: "?" indicates that the node may have 0 or 1 instance; "*" indicates that the node may have 0 or more instances; no symbol indicates that the node may have 1, and only 1, instance; and "+" indicates that the node may have 1 or more instances. When a node name is "<x>", it indicates that the node name may be assigned at will as long as no repetition occurs among the plurality of instances.

The meanings and usages of each MO node are introduced one by one in the following:

The Topo node records all MO information for remotely managing a sensor network topology, the MO information generally includes: overall characteristic information and a management method of a sensor network, information and a management method of each sensor network device, and information and a management method of a topology relationship among the sensor network devices. The Topo node may be placed at a proper location (under a root node or other MO leaf nodes) in the management tree of the gateway according to requirements of specific implementation. Specifically, the Topo node includes the following child nodes:

1) NetworkID: used to describe information of an identifier of a sensor network managed by the gateway. For example, in the case of a ZigBee network, the NetworkID corresponds to a 16-bit PANID parameter and/or a 64-bit ExtendedPANID parameter; and in the case of a BlueTooth network, the NetworkID corresponds to a device identifier of a master device (Master) in the network. The information may be extracted from a management information base of the gateway device.

2) TopoTyp: used to describe a topology type of the sensor network, which may be a ring topology, star topology, tree topology, mesh topology, bus topology, hybrid topology, and the like. The information may be decided according to a specific technology sensor network connected to the gateway device (for example, a BlueTooth network uses a star structure and a ZigBee network uses a tree structure or mesh structure), or the information may be further extracted from the management information base of the gateway device.

3) Ext: used to extend other nodes to describe other topology characteristics of the sensor network managed by the gateway.

4) Operations: used to provide an overall operation method for the topology management for the sensor network managed by the gateway. The following executable child nodes are further included:

41) DiscTopo: indicating that the gateway discovers and reports information of the sensor network topology. The node may further include a child node:

411) Notification: where the value of the node may be TRUE or FALSE, used to indicate whether the gateway proactively notifies a remote device management server (M2M service platform) of a subsequent change status of the sensor network topology, and some filtering conditions (for example, the topology changes related to which device need to be notified, the frequency of the notification, and which device management servers the notification need to be sent to) may be further included.

42) DiscTopoAndService: indicating that the gateway discovers and reports information of the sensor network topology, and discovers and reports service and application provided by each sensor network device. The node may further include the following child node:

421) Notification: where the value of the node may be TRUE or FALSE, used to indicate whether the gateway proactively notifies a remote device management server (M2M service platform) of the subsequent change status of the sensor network topology and change status of the service of the sensor device. And some filtering conditions (for example, the topology and service changes related to which device require to be notified, the frequency of the notification, and which device management servers the notification needs to be sent to) may be further included.

43) Ext: indicating that other topology management operation methods may also be extended for different sensor network technologies. For example, for a ZigBee network, a FormNetwork node and a StartRouter node may be extended, used to indicate that the gateway device acts as a coordinator to reconstruct the ZigBee network and acts as a router to rejoin in the network, respectively. Accordingly, their respective child nodes may be further extended to store corresponding operation parameters.

5) DevList: used to describe information of a topology related to each sensor network device managed by the gateway and a topology management operation method related to each sensor network device managed by the gateway, where the information of each sensor network device is represented by one <x> node under the DevList. Moreover, the <x> node further includes the following child nodes:

51) DevId: the identifier of a sensor device, where the specific form of the DevId may differ in different sensor network technologies. For example, the identifier of a ZigBee device is a 64-bit extended IEEE address, while the identifier of a BlueTooth device is a 48-bit BD_ADDR address.

52) DevTyp: the type of a sensor device, where a specific form of the DevTyp may differ in different sensor network technologies. For example, ZigBee devices may be classified into a coordinator (Coordinator), a router (Router), and an end device (End Device); while BlueTooth devices may be classified into a master device (Master), a slave device (Slave), or may be classified into a device of a basic rate, a device with an enhanced rate, a high-speed device, and an energy saving device.

53) Name: the name or nickname of a device.

54) LocAddr: the local address of a device for local communications of a sensor network, where the specific form of the LocAddr may differ in different sensor network technologies. For example, a 16-bit network address of a ZigBee device and a 3-bit LT_ADDR of a BlueTooth device. For some sensor network devices which may have a plurality of local addresses for different working modes or purposes (for example, a BlueTooth device may further include 8-bit PM_ADDR and AR_ADDR for a Park working mode), the node may also be configured to describe the plurality of different local addresses by including a plurality of child nodes.

55) Services: describing service provided by a sensor device, where each service is described by an MO child tree included in a corresponding <x> node, and the specific form of the MO child tree may differ in different sensor network technologies. For example, service of a ZigBee device and service of a BlueTooth device may be described by an MO child tree shown in FIG. 3 and that shown in FIG. 4, respectively.

Figure 3:
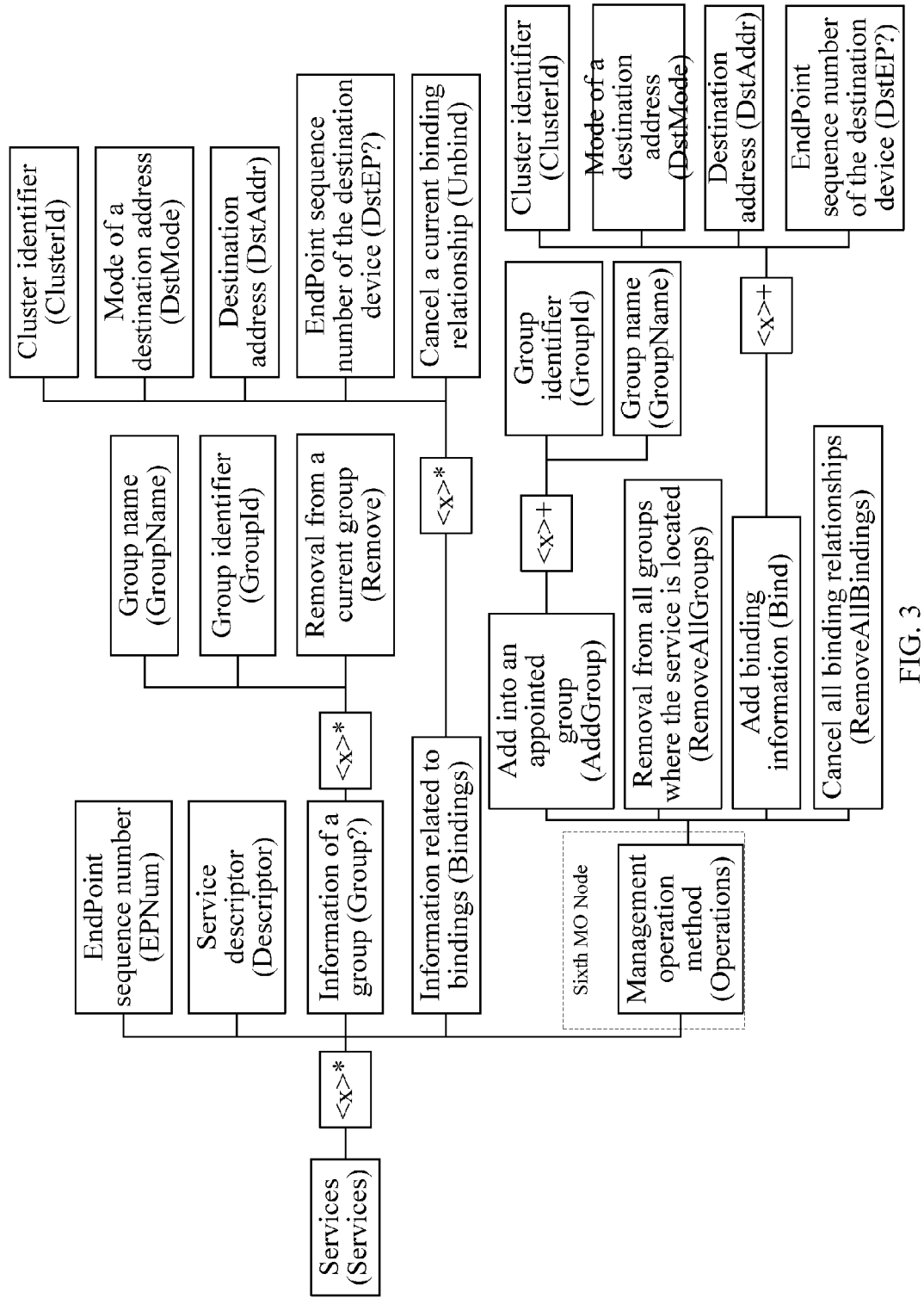
FIG. 3 is a schematic diagram of an MO child tree of service of a ZigBee device according to an embodiment of the present invention.

FIG. 3 is a schematic diagram of an MO child tree of service of a ZigBee device in an embodiment of the present invention. For each ZigBee device, a service provided by the ZigBee device is run on a corresponding endpoint (EndPoint) and has a corresponding group and binging relationship, so each service <x> may be described by MO nodes in the following:

31) EPNum: the sequence number (1-240) of an EndPoint for running the service.

32) Descriptor: the descriptor for describing the service, where the specific content may include, according to the ZigBee regulations, a simple descriptor (SimpleDescritpor) and a complex descriptor (ComplexDescritpor).

33) Groups: used to describe information of a group where the service belongs to, where each group where the service belongs to is identified by an <x> node. The following child nodes may be further included:

331) GroupName: used to describe a group name which is readable by a user.

332) GroupId: used to describe a group identifier, which specifically is a 16-bit group address.

333) Remove: indicating that the node is an executable node, configured to instruct the removal of a current service from a current group.

34) Bindings: used to describe information related to bindings of a current service, where each binding relationship is represented by one <x>, and the following child nodes are further included:

341) ClusterId: the identifier of a cluster bound with a current service.

342) DstMode: the mode of a bound destination address, for example, a group mode or a single device mode.

343) DstAddr: a bound destination address.

344) DstEP: the sequence number of an EndPoint of a bound destination device, which is necessary only when the DstMode is the single device mode.

345) Unbind: the node is an executable node, used to instruct the removal of a current binding relationship of a current service.

35) Operations: used to provide a management operation method for a current service, and the following executable child nodes are included:

351) AddGroup: used to add a current service to specified groups, where each group is described by one <x> node, and child nodes, namely, GroupId and GroupName, used to specify an identifier and a name of the specified group are further included.

352) RemoveAllGroups: used to remove a current service from all groups where the service is located.

353) Bind: used to add several pieces of binding information for a current service, where each piece of binding information is described by an <x> node, and the child nodes, namely, ClusterId, DstModeId, DstAddr, and DstEP, the meanings of which are the same as those of child nodes corresponding to the Services/<x>/Bindings/<x> node.

354) RemoveAllBindings: used to remove all binding relationships of a current service.

Figure 4:
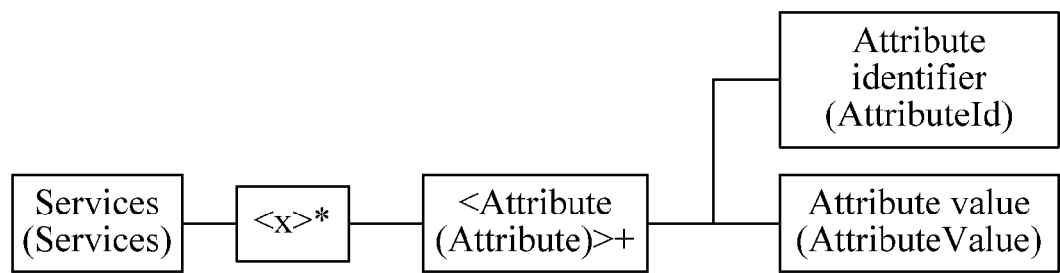
FIG. 4 is a schematic diagram of an MO child tree of service of a BlueTooth device according to an embodiment of the present invention.

FIG. 4 is a schematic diagram of an MO child tree of service of a BlueTooth device according to an embodiment of the present invention. Referring to FIG. 4, for each BlueTooth device, each service <x> provided by the BlueTooth device is described by a series of attributes (Attribute). Each attribute is described by one <Attribute> MO node, which the following child nodes are further included:

AttributeId: the attribute identifier defined by the BlueTooth regulations; and

AttributeValue: the value of an attribute.

56) Neighbors: describing a topology connection relationship between the sensor network device and a neighbor device, where each neighbor device is represented by one <x> node, and the following child nodes are further included:

561) Ref: directed to a link reference for describing the location of an MO node of the neighbor device (that is, Topo/DevList/<x> corresponding to the neighbor device), so that complete information of the neighbor device may be acquired according to the reference.

562) DevId: optional, used to directly describe the device identifier of the neighbor device (the same as Topo/DevList/<x>/DevId), so that when it is unnecessary to acquire the complete information of the neighbor device, the device identifier of the neighbor device may be directly acquired.

563) LQI: when being supported by the sensor network technologies, LQI is used to record the quality of the communication link between a current device and a neighbor device.

564) Relationship: describing a topology link relationship between the neighbor device and a current device, where the specific form of the Relationship may differ in different sensor network technologies. For example, relationships such as parent (Parent), child (Child), sibling (Sibling), and none (None) may be included among ZigBee devices, while relationships such as master (Master), slave (Slave), parked slave (Parked Slave), advertising (Advertising), and none (None) may be included among BlueTooth network devices.

565) Operations: providing a topology management operation for the neighbor sensor device through some executable child nodes, and including:

5651) Connect: used to instruct the current device to establish a topology connection relationship with the neighbor device, in which, for example, assuming that a current Relationship with the neighbor device is None, a Parent (ZigBee network) or a Slave (BlueTooth network) relationship with the neighbor device may be established through executing the MO node. If the current device has established a topology connection relationship with another neighbor device, according to requirements of a specific sensor network technology, the connection relationship with the other neighbor device might first need to be disconnected.

5652) Ext: indicating that other topology management operation child nodes may also be extended for different sensor network technologies. For example, for a BlueTooth network, nodes of Park, Unpark, and SwitchRole may be extended to instruct the current device to send to neighbor device topology connection management commands such as parking a slave device, activating a slave device, and switching a mater/slave relationship, respectively.

57) Operations: providing a topology management operation for the current sensor device through some executable child nodes, and including.

571) Disconnect: used to instruct the current device to leave the sensor network. For some sensor network technologies (for example, ZigBee) which support a multi-hop topology, the node may further include the following child node:

5711) RemoveChildren: its value being TRUE or FALSE, used to, when the current device is still connected to another child device or slave device, indicate the current device whether it is necessary to further remove the child device or the slave device from the sensor network.

572) Ext: other topology management operation child nodes may also be extended for different sensor network technologies.

58) Ext: for different sensor network technologies, other child nodes may also be extended to describe information related to other topologies of a current sensor network device. For example, for a ZigBee device, a PermitJoining node may be extended to record whether the current device permits other device to establish a topology connection relationship with the ZigBee device.

It should be noted that the management tree model used in sensor network remote topology management is merely a typical example, where relative locations or names of the MO nodes in the management tree may be different in an actual deployment. The functions the same as those of the present invention can be implemented as long as the expressed meanings are the same and a consistence is achieved between the gateway and the remote device management server.

Step 12: The gateway manages the sensor network according to the DM command, where the management includes discovering the sensor network topology, describing the sensor network topology, or modifying the sensor network topology.

For the discovering of the sensor network topology, a corresponding DM command is a DM discovery command. For the describing of the sensor network topology, a corresponding DM command is a DM get command. For the modifying of the sensor network topology, a corresponding DM command is a DM modification command. Moreover, in specific implementation, the DM discovery command, the DM get command, and the DM modification command may specifically be an Exec command, a Get command, a Replace command, and the like.

In this embodiment, a DM command is received through information of a preconstructed topology and a uniform management interface (that is, a DM protocol interface) consistent with remote device management technologies in the prior art is used, so that an M2M service platform (or other device management servers) can perform remote topology management and maintenance not only on the M2M gateway, but also on a sensor network connected to the M2M gateway, thereby reducing the complexity of implementing the management.

The implementation of the function of remote topology management of the sensor network through the gateway is illustrated in the following with reference to the specific embodiments in combination with the foregoing management tree model. (Because a portion of the gateway is definitely a sensor network device, the following method is also applicable to the topology management of the portion of the sensor network device in the gateway).

For the discovery procedure, the receiving the DM command sent by the device management server includes: receiving the DM discovery command sent by the device management server, where the DM discovery command acts on the fourth MO node.

The managing the sensor network according to the DM command includes: discovering a topology, and mapping and storing the topology to the second MO node. The discovering the topology includes at least one of: searching for information of an identifier and an address of a device, searching for additional information of the device, searching for information of an associated device, searching for information of a connection status among the devices; and/or, discovering service, and mapping and storing the service to the third MO node. The discovering the service includes at least one of: searching for device service information, searching for group information related to the service of the device, and searching for binding information among the service of the device.

In addition, the fourth MO node further includes a child node configured to indicate to report a subsequent topology change. The managing the sensor network according to the DM command further includes: detecting joining or leaving of a sensor device; updating, according to the detected joining or leaving of the sensor device in or from the sensor network, characteristic information of each sensor device and/or topology connection relationship among sensor devices in the second MO node, and/or, information about a service provided by each sensor device in the third MO node; and reporting a notification message to the device management server. Furthermore, the notification message may notify the device management server that the updated information may be acquired, so that the device management server subsequently acquires the updated topology connection relationship among the sensor devices and/or the updated information about a service provided by each sensor device. The notification message may also carry the updated topology connection relationship among the sensor devices and/or the information about a service provided by each sensor device.

Figure 5A:
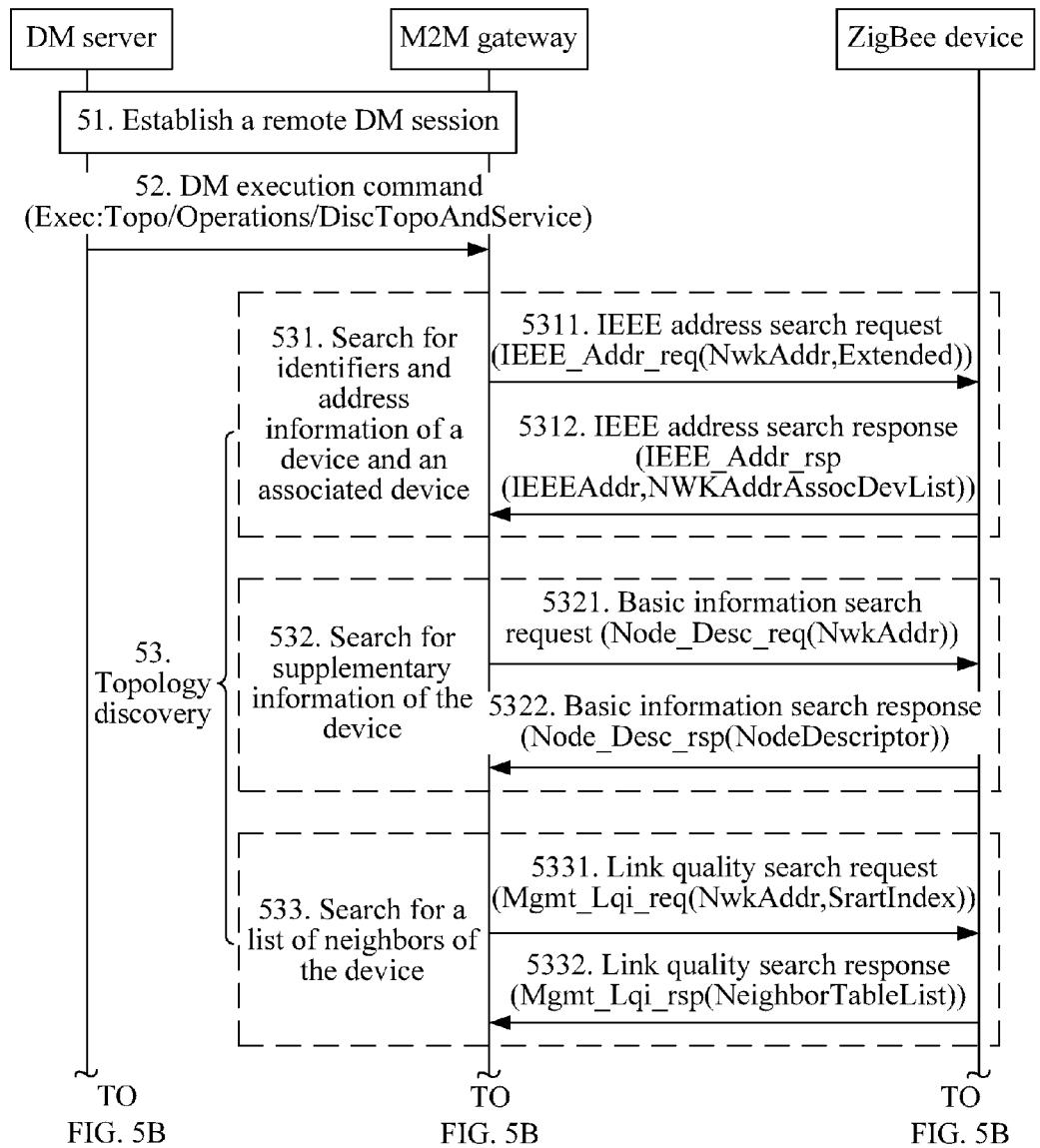
FIG. 5A and FIG. 5B is a schematic flow chart of a method according to Embodiment 2 of the present invention.
Figure 5B:
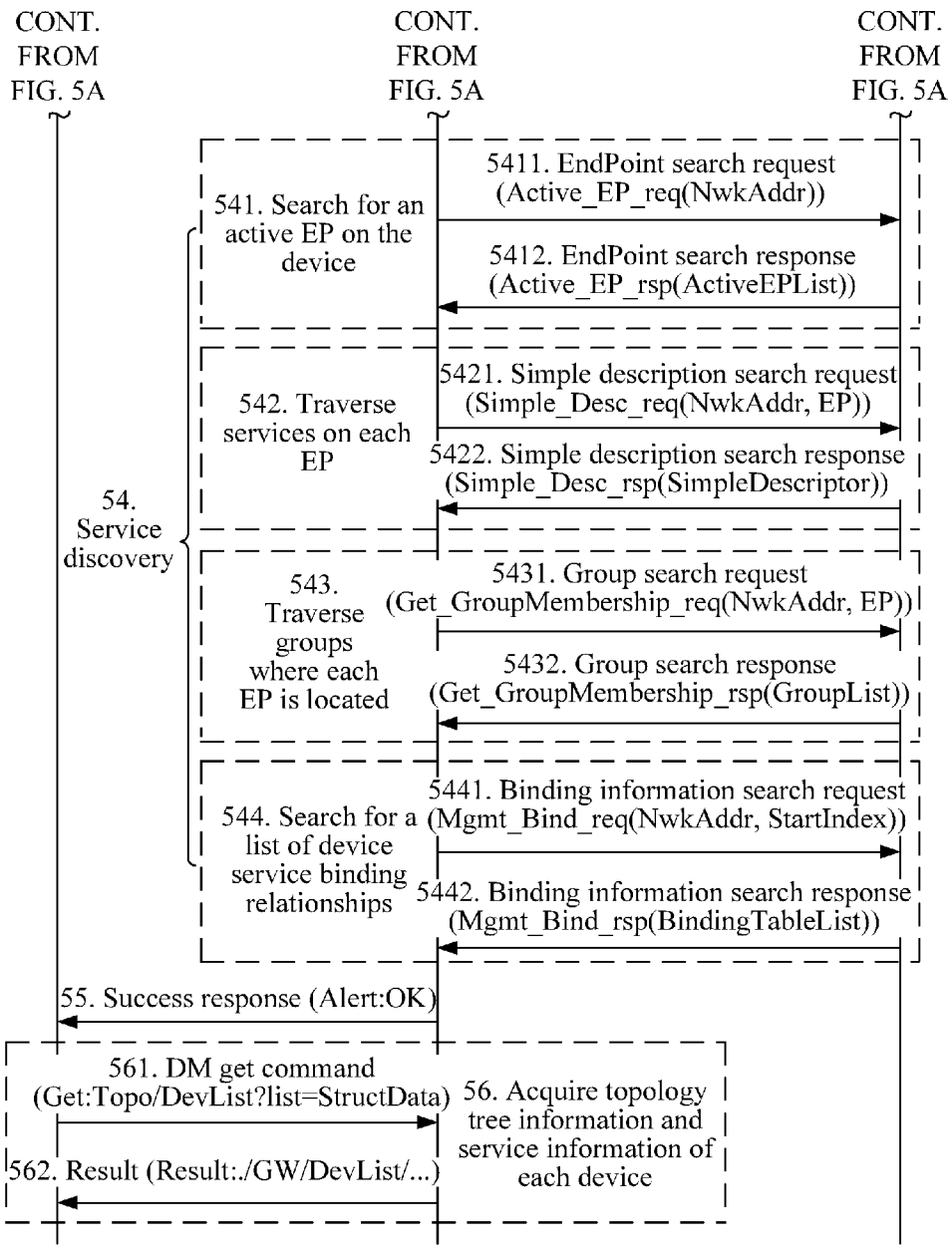

A ZigBee network and a BlueTooth network are described in the following:

FIG. 5A and FIG. 5B is a schematic flow chart of a method according to Embodiment 2 of the present invention. This embodiment describes remote discovery of a ZigBee network topology and device service information through a gateway. Referring to FIG. 5A and FIG. 5B, this embodiment includes the following steps:

Step 51: A device management server (DM Server) establishes a remote DM session with an M2M gateway (M2M gateway).

The DM Server may also be an M2M service platform.

The DM server may establish the remote DM session with the M2M gateway using a standard DM protocol in the prior art. In the management session, the DM server can perform remote device management for the M2M gateway using an existing DM technology.

Step 52: The DM server sends a DM execution (Exec) command (Exec:Topo/Operations/DiscTopoAndService) to the M2M gateway.

Specifically, if the DM server expects to further discover information of a sensor network topology connected to the M2M gateway and information about a service provided by the sensor device, the DM server sends one DM command to the M2M gateway. The DM command specifically is the DM execution (Exec) command, which acts on a management object, Topo/Operations/DiscTopoAndService, defined in FIG. 2. The meaning of "acts on" refers to appointing a path of a target MO node (that is, the location of the MO node in the MO tree, Topo/Operations/DiscTopoAndService in this embodiment), so that a DM client determines for which MO node the DM command (Exec in this embodiment) is executed.

Moreover, if the DM server does not need to obtain a notification of a subsequent change of the information of the sensor network topology or the service information of the sensor device, it is unnecessary to set a management object Topo/Operations/DiscTopoAndService/Notification, or the value of the management object is set to be FALSE.

Subsequently, the M2M gateway parses the DM command and determines that it is necessary to complete the process of discovering information of the ZigBee network topology and service information of the ZigBee device through a corresponding ZigBee protocol request. The step 53 of discovering a topology includes the step 531 of searching for identifiers and address information of a device and an associated device of the device, the step 532 of searching for additional information (type) of the device, and the step 533 of searching for a list of neighbors of the device. The step 54 of discovering service includes the step 541 of searching for an active end point (EndPoint, EP) on the device, the step 542 of traversing service on each EP, the step 543 of traversing groups where each EP is located, and the step 544 of searching for a list of device service binding relationships.

The step 531 of searching for an IEEE address of the device and the associated device includes the following steps:

Step 5311: The M2M gateway sends an IEEE address search request (IEEE_Addr_req) to the ZigBee device.

Specifically, the M2M gateway sends the IEEE address search request (IEEE_Addr_req) in sequence to devices (ZigBee Device) in the ZigBee network where the M2M gateway is located, which carries a network address (NwkAddr, starting from a ZigBee coordinator 0x0000) and an extended response indication parameter (Extended) of a target device, where the target device refers to a corresponding ZigBee device each time the search is performed.

Step 5312: The ZigBee device returns an IEEE address search response (IEEE_Addr_rsp) to the M2M gateway.

Specifically, the target device returns the IEEE address search response (IEEE_Addr_rsp) to the M2M gateway, where the IEEE address of the target device is returned through a parameter IEEEAddr, and a list of network addresses of ZigBee devices associated with the target device is returned through a parameter NWKAddrAssocDevList.

According to the list of the network addresses of the associated ZigBee devices, the M2M gateway may perform iteration one by one using the same method to discover information of all ZigBee devices in the whole network and IEEE addresses of the ZibBee devices, map the information all ZigBee devices in the whole network and IEEE addresses of the ZibBee devices to a Topo/DevList/<x>/DevId node in the gateway MO tree, and at the same time map network addresses of all the ZigBee devices to a Topo/DevList/<x>/LocAddr node in the gateway MO tree.

The searching for additional information of the device (for example, a type or name of the device) 532 includes the following steps.

Step 5321: The M2M gateway sends a basic information search request (Node_Desc_req) to the ZigBee device.

Specifically, the M2M gateway sends the basic information search request (Node_Desc_req), which carries a network address (NwkAddr=0x?) of the target device, to all devices in the ZigBee network where the M2M gateway is located.

Step 5322: The ZigBee device returns a basic information search response (Node_Desc_rsp) to the M2M gateway.

Specifically, the target device returns the basic information search response (Node_Desc_rsp) to the M2M gateway, where the type of the device is returned through a parameter NodeDescriptor in the response message, and the type is mapped to a Topo/DevList/<x>/DevTyp node in the MO tree by the M2M gateway.

The step 533 of searching for the list of neighbors of the device includes the following steps:

Step 5331: The M2M gateway sends a link quality search request (Mgmt_Lqi_req) to the ZigBee device.

Specifically, the M2M gateway sends the link quality search request (Mgmt_Lqi_req), which carries the network address and a start index (NwkAddr, StartIndex) of the target device, to all devices in the ZigBee network where the M2M gateway is located.

Step 5332: The ZigBee device returns a link quality search response (Mgmt_Lqi_rsp) to the M2M gateway.

Specifically, the target device returns the link quality search response (Mgmt_Lqi_rsp) to the M2M gateway, where the information of all neighbor devices can be discovered is returned through a parameter NeighborTableList in the response message, and the information of all neighbor devices includes the information of link quality and the information of a topology connection relationship, and the returned information of all neighbor devices is mapped one by one to a Topo/DevList/<x>/Neighbors/<x> node in the MO tree by the M2M gateway.

The step 541 of searching for the active end point (EndPoint, EP) on the device includes the following steps:

Step 5411: The M2M gateway sends an EndPoint search request (Active_Ep_req) to the ZigBee device.

Specifically, according to a topology discovery result in step 53, the M2M gateway sends the EndPoint search request (Active_Ep_req) to all devices in the ZigBee network where the M2M gateway is located, where, the EndPoint search request (Active_Ep_req) carries the network address (NwkAddr) of the target device.

Step 5412: The ZigBee device returns an EndPoint search response (Active_Ep_rsp) to the M2M gateway.

Specifically, the target device returns the EndPoint search response (Active_Ep_rsp) to the M2M gateway, where a list of EndPoints activated by the target device is returned through a parameter ActiveEPList in the response message, and the list of EndPoints is mapped to a Topo/DevList/<x>/Services/<x>/EPNum node in the MO tree by the M2M gateway.

The step 542 of traversing the service on each EP includes the following steps:

Step 5421: The M2M gateway sends a simple description search request (Simple_Desc_req) to the ZigBee device.

Specifically, according to a search result in step 541, the M2M gateway further sends the simple service information search request (Simple_Desc_req) to each activated EndPoint of all ZigBee devices, where, the Simple_Desc_req carries the network address (NwkAddr) and the sequence number of an EndPoint (EP) of the target device.

Step 5422: The ZigBee device returns a simple service information search response (Simple_Desc_rsp) to the M2M gateway.

Specifically, the target device returns the simple description search response (Simple_Desc_rsp) to the M2M gateway, where, the description information of a service run by a specified EndPoint is returned through a SimpleDescriptor parameter in the response message, and the description information is mapped to a Topo/DevList/<x>/Services/<x>/Descriptor node in the MO tree by the M2M gateway.

The step 543 of traversing the group where each EP is located includes the following steps:

Step 5431: The M2M gateway sends a group search request (Get_GroupMembership_req) to the ZigBee device.

Specifically, according to the search result in step 541, the M2M gateway further sends the group search request (Get_GroupMembership_req) to each activated EndPoint of all ZigBee devices, where, the group search request carries the network address (NwkAddr) and the sequence number of an EndPoint (EP) of the target device.

Step 5432: The ZigBee device returns a group search response (Get_GroupMembership_rsp) to the M2M gateway.

Specifically, the target device returns the group search response (Get_GroupMembership_rsp) to the M2M gateway, where, the information of a table of groups where the specified EndPoint is run is returned through a parameter GroupList in the response message, and the information of the table of groups is mapped to a Topo/DevList/<x>/Services/<x>/Groups node in the MO tree by the M2M gateway.

The step 544 of searching for the list of device service binding relationship includes the following steps:

Step 5441: The M2M gateway sends a binding information search request (Mgmt_Bind_req) to the ZigBee device.

Specifically, according to the topology discovery result in step 541, the M2M gateway sends the binding information search request (Mgmt_Bind_req) to all devices in the ZigBee network where the M2M gateway is located, where, the binding information search request carries the network address and the start index (NwkAddr, StartIndex) of the target device.

Step 5442: The ZigBee device returns a binding information search response (Mgmt_Bind_rsp) to the M2M gateway.

Specifically, the target device returns the binding information search response (Mgmt_Bind_rsp) to the M2M gateway, where a list of service binding information of the target device is returned through a BindingTableList parameter in the response message, and the list of service binding information is mapped to a Topo/DevList/<x>/Services/<x>/Bindings node in the MO tree by the M2M gateway.

Step 55: The M2M gateway returns a success response (Alert:OK) to the DM server.

Specifically, the M2M gateway sends a DM response message to the device management server, where, the carried <Alert> element indicates that a topology management function of discovering the information of the ZigBee network topology and the topology management function of discovering the service information of the ZigBee device is successfully executed.

Step 56: Acquire topology information and service information of each device, which includes the following steps:

Step 561: The DM server sends a DM get (Get) command (Get:Topo/DevList?list=StructData) to the M2M gateway.

Specifically, the DM server sends to the M2M gateway one DM get (Get) command, which acts on a Topo/DevList management object node shown in FIG. 2. and the DM get command further carries a parameter list=StructData for instructing the M2M gateway to return a child tree structure and a value of each node under Topo/DevList node.

Step 562: The M2M gateway returns a result (Result:/GW/ DevList/ . . . ) to the DM server.

Specifically, the M2M gateway returns the result to the DM server so as to restore the information of the ZigBee network topology and the service information of the ZigBee device acquired by the M2M gateway, where, the result carries the child tree structure and the value of each node (Result:/GW/ DevList/ . . . ) under the Topo/DevList node.

In addition, the device management server may also send to the M2M gateway one DM get (Get) command, which acts on management object nodes such as the Topo/NetworkId or the Topo/TopoTyp shown in FIG. 2 to acquire information of another related network topology.

It should be noted that:

in step 56, the DM server also may send to the M2M gateway the DM get (Get) command and acts on some specific management object nodes (Topo/DevList/<x>/Neighbors), so as to acquire a portion of the information of the network topology or a portion of the device service information.

In this embodiment, the DM server sends the DM command to the M2M gateway. The DM command acts on the MO information for discovering the ZigBee network topology and the device service information, so as to conveniently implement the discovery of the ZigBee network topology and the device service information.

Figure 6:
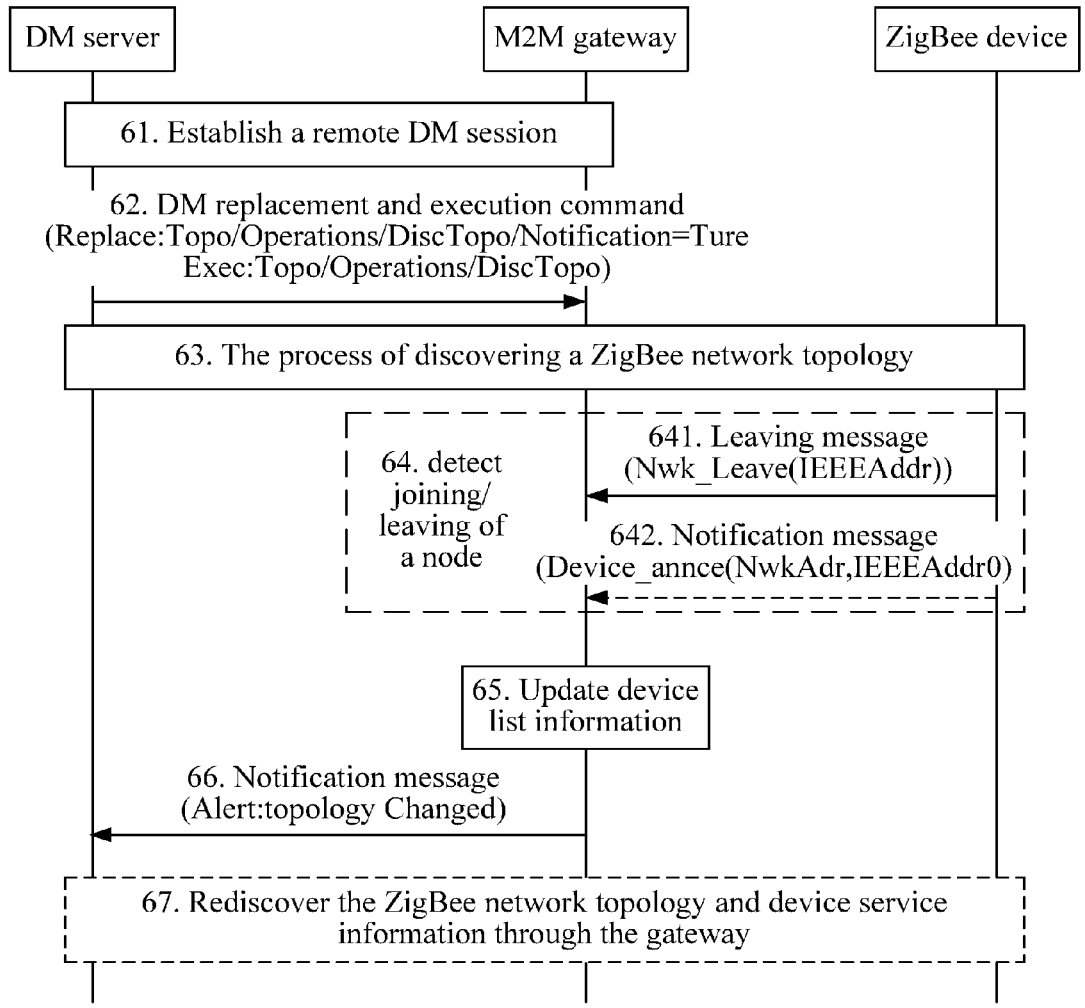
FIG. 6 is a schematic flow chart of a method according to Embodiment 3 of the present invention.

FIG. 6 is a schematic flow chart of a method according to Embodiment 3 of the present invention. This embodiment describes the step of reporting joining/leaving of a ZigBee network device through a gateway. Referring to FIG. 6, this embodiment includes the following steps:

Step 61: A device management server (DM Server) establishes a remote DM session with an M2M gateway (M2M gateway).

For the specific content, refer to step 51.

Step 62: The DM server sends a DM replacement (Replace) and an execution (Exec) command (Replace:Topo/ Operations/DiscTopo/Notification=True; Exec:Topo/Operations/DiscTopo) to the M2M gateway.

Specifically, if the DM server may obtain a notification of a change of the topology information after the DM server discovers the information of a sensor network topology connected to the M2M gateway the DM server first sends to the M2M gateway one DM replacement (Replace) command, where, the replacement command acts on the management object node Topo/Operations/DiscTopo/Notification defined in FIG. 2, and the value of the node is set to be TRUE or is set to be the address identifier of the device management server, and then the DM server sends to the M2M gateway one DM execution (Exec) command, which acts on the node Topo/ Operations/DiscTopo.

The M2M gateway parses the DM command and determines that it is necessary to complete the process of discovering the information of the sensor network topology through a corresponding sensor network protocol request, and that it is necessary to report a subsequent topology information update, which specifically includes the following steps:

Step 63: The process of discovering a ZigBee network topology.

For the specific content, refer to step 53, step 55, and step 56 in FIG. 5A and FIG. 5B.

Step 64: Detect joining/leaving of a device, which specifically includes the following steps:

Step 641: A ZigBee device sends a leaving message (Nwk_leave) to the M2M gateway.

Specifically, when a ZigBee device leaves the ZigBee network managed by the gateway, the ZigBee device sends a leaving message (Nwk_leave) to the M2M gateway, where, the leaving massage carries a parameter IEEEAddr that indicates leaving, and the gateway learns about the leaving of the ZigBee device according to the parameter IEEEAddr.

Step 642: The ZigBee device sends a notification message (Device_annce) to the M2M gateway.

Specifically, when a ZigBee device joins in the ZigBee network managed by the gateway, the ZigBee device sends a notification message (Device_annce) to the M2M gateway, where, the notification message carries a network address (NwkAddr) and a IEEEAddr parameter that indicates joining, and the gateway learns about the joining of the new device according to the IEEEAddr parameter.

Step 641 and step 642 are not necessarily in chronological order.

Step 65: The M2M gateway updates device list information.

According to the information of the leaving or the joining of the ZigBee device, the M2M gateway updates the information of the topology management tree in FIG. 2, removes topology and service information related to the ZigBee device which has left, and adds topology and service information related to the newly joined ZigBee device.

Step 66: The M2M gateway sends a notification message (Alert: Topology Changed) to the DM server.

Specifically, according to the setting information of the Topo/Operations/DiscTopo/Notification node in step 62, the M2M gateway sends a DM notification message to the device management server, where <Alert> may be used to indicate that the notification is used for reporting a change of the sensor network topology information (Alert: Topology Changed).

Step 67: Rediscover the ZigBee network topology and device service information through the gateway.

Specifically, similar to step 56, the DM server further acquires, according to the notification in step 66, the updated ZigBee sensor network topology information from the M2M gateway; or, similar to step 52 to step 56, the DM server executes the process of discovering sensor network topology information and device service information again.

In this embodiment, the DM server sends a DM command to the M2M gateway. The DM command acts on MO information for reporting joining/leaving of a ZigBee network device, so as to conveniently implement the reporting of the joining/leaving of the ZigBee network device.

Figure 7A:
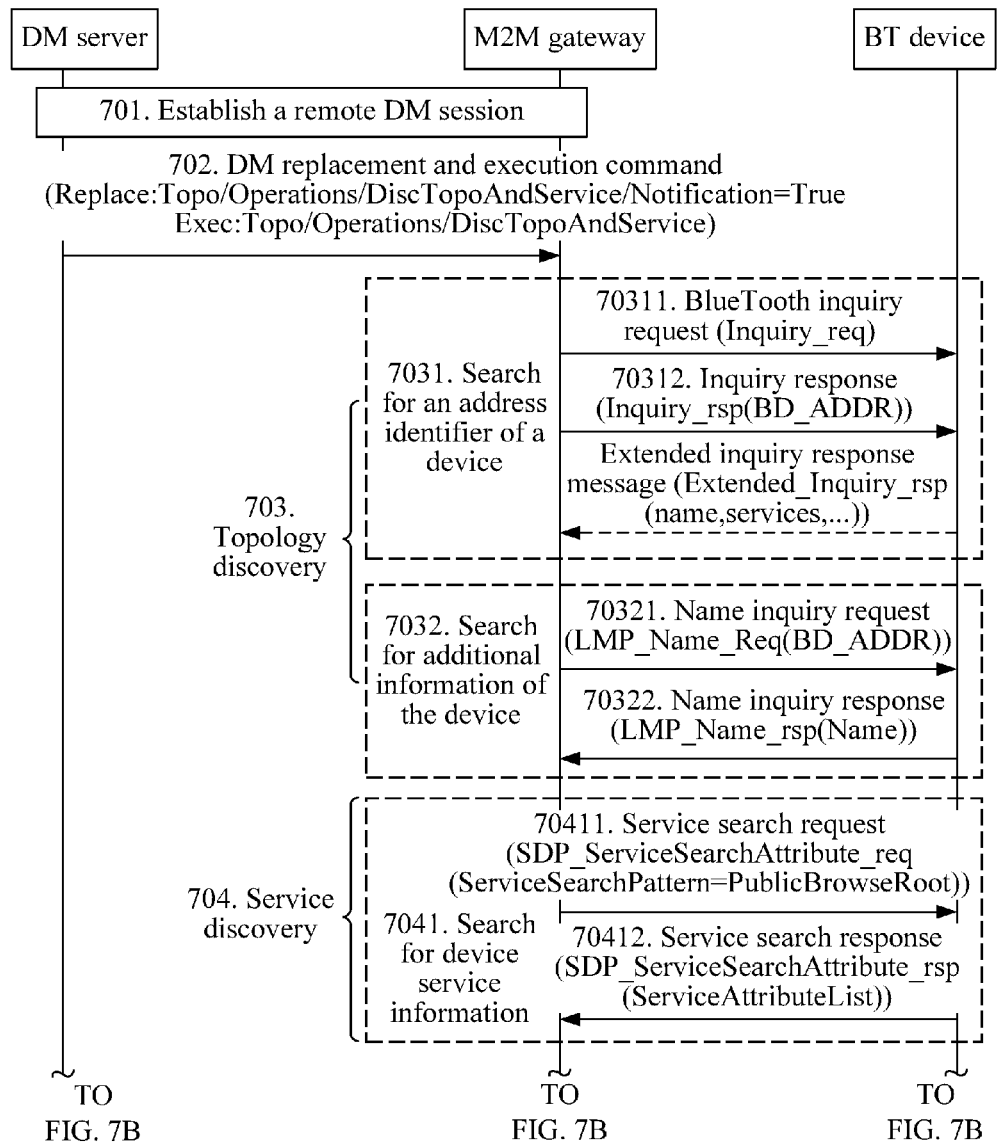
FIG. 7A and FIG. 7B is a schematic flow chart of a method according to Embodiment 4 of the present invention.
Figure 7B:
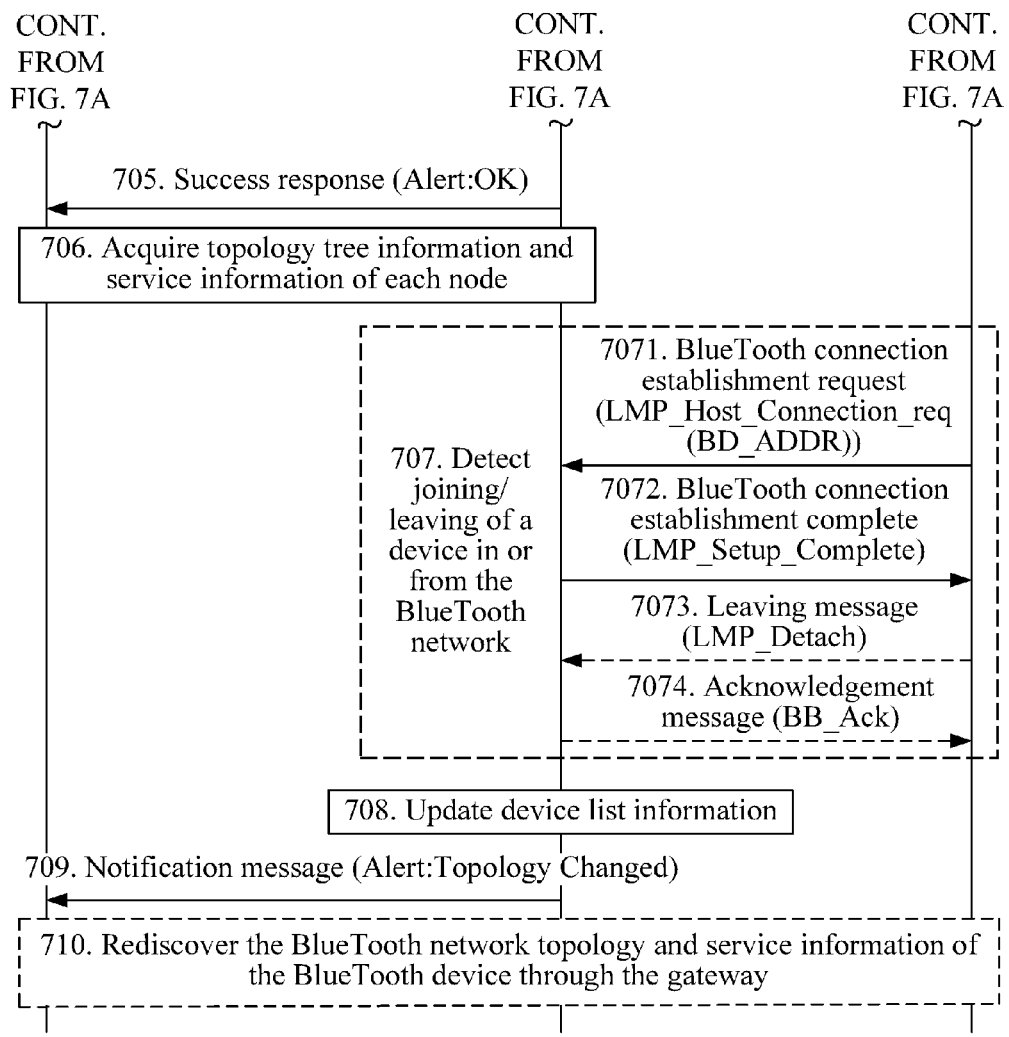

FIG. 7A and FIG. 7B are a schematic flow chart of a method according to Embodiment 4 of the present invention. This embodiment describes the discovery of a BlueTooth network topology and device service information through a gateway. Referring to FIG. 7A and FIG. 7B, this embodiment includes the following steps:

Step 701: A device management server (DM Server) establishes a remote DM session with an M2M gateway (M2M gateway).

For the specific content, refer to step 51.

Step 702: The DM server sends to the M2M gateway a DM replacement (Replace) command and a DM execution (Exec) command (Replace:Topo/Operations/DiscTopoAndService/
   Notification=True and Exec:Topo/Operations/DiscTopoAndService).

Specifically, if the DM server expects to further obtain, after discovering the sensor network topology information and the device service information, a notification of a change of the information, the DM server first sends to the M2M gateway one DM replacement (Replace) command, where, the DM replacement command acts on the management object node Topo/Operations/DiscTopoAndService/Notification defined in FIG. 2, and the value of the node is set to be TRUE or is set to be an address identifier of the device management server. And then the DM server sends to the M2M gateway one DM execution (Exec) command, which acts on the node Topo/Operations/DiscTopoAndService. The M2M gateway parses the DM command and determines that it is necessary to complete the process of discovering information of the BlueTooth network topology and the device service through a corresponding BlueTooth protocol request, and that it is necessary to report a subsequent information update.

Step 703: Discover a topology, which includes the following steps:

Step 7031: Search for the address identifier of a device, which includes the following steps:

Step 70311: The M2M gateway sends a BlueTooth inquiry request (Inquiry_req) to a BlueTooth device (BT device).

Specifically, the M2M gateway advertises the BlueTooth inquiry request (Inquiry_req) to the vicinity.

Step 70312: The BlueTooth device returns an inquiry response (Inquiry_rsp) to the M2M gateway.

If a neighbor BlueTooth device receives the request, the neighbor BlueTooth device returns an inquiry response (Inquiry_rsp) and carries a device identifier of the neighbor BlueTooth device through a BD_ADDR parameter. The M2M gateway maps the device identifier to a Topo/DevList/<x>/DevId node in the gateway MO tree.

Optionally, if the neighbor BlueTooth device supports an extended inquiry response message (Extended_Inquiry_rsp), the neighbor BlueTooth device may further return information such as the name (name) and provided service (services) of the device to the gateway, which are then mapped by the gateway to a Topo/DevList/<x>/Name node and a Topo/DevList/<x>/Service node, respectively.

Step 7032: Search for additional information of the device, which includes the following steps:

Step 70321: The M2M gateway sends a name inquiry request (LMP_Name_req) to the BT device.

Specifically, the M2M gateway sends the name inquiry request (LMP_Name_req) in a sequence to all devices in the BlueTooth network where the M2M gateway is located, where the name inquiry request carries a network address (BD_ADDR) of a target device.

Step 70322: The BT device returns a name inquiry response (LMP_Name_rsp) to the M2M gateway.

Specifically, the target device returns the name inquiry response (LMP_Name_rsp) to the M2M gateway, where a name of the device is returned through a Name parameter in a response message, and the name is mapped to a Topo/DevList/<x>/Name node in the MO tree by the M2M gateway.

It is understandable that, if the name is acquired in step 70312, the step of acquiring the name in step 7032 is not required.

Step 704: Discover a service, which includes the following steps:

Step 7041: Search for device service information, which includes the following steps:

Step 70411: The M2M gateway sends a service search request (SDP_ServiceSearchAttribute_req) to the BT device.

Specifically, the M2M gateway sends the service search request (SDP_ServiceSearchAttribute_req) to all devices in the BlueTooth network where the M2M gateway is located, where, the service search request carries the network address of the target device and a parameter ServiceSearchPattern=PublicBrowseRoot.

Step 70412: The BT device returns a service search response (SDP_ServiceSearchAttribute_rsp) to the M2M gateway.

Specifically, the target device returns the service search response (SDP_ServiceSearchAttribute_rsp) to the M2M gateway, where the information of a list of service provided by the target device is returned through a parameter ServiceAttributeList in the response message, and the service are mapped one by one to a Topo/DevList/<x>/Service/<x>/<Attributes> node in the MO tree by the M2M gateway.

Step 705: The M2M gateway returns a success response (Alert:OK) to the DM server.

Specifically, the M2M gateway sends a DM response message to the device management server, where the carried <Alert> element indicates that the topology management function of discovering the information of the BlueTooth network topology and the service information of the ZigBee device is successfully executed.

Step 706: Acquire topology information and service information of each device.

For the specific content, refer to step 56.

Furthermore, this embodiment may also include the following steps.

Step 707: Detect joining/leaving of a device in or from the BlueTooth network, which includes the following steps:

For a joining scenario, in step 7071, when a device joins in the BlueTooth network managed by the gateway, the BlueTooth device sends a BlueTooth connection establishment request (LMP_Host_Connection_req) to the M2M gateway, where a BD_ADDR parameter indicates the identifier of the joined device.

Step 7072: The M2M gateway returns a BlueTooth connection establishment complete (LMP_Setup_Complete) message to the BlueTooth device to confirm that the device has successfully joined in the network.

Alternatively, for a leaving scenario:

Step 7073: When a device is leaving, the BlueTooth device sends a leaving (LMP_Detach) message to the M2M gateway.

Step 7074: The M2M gateway may determine, according to a current connection corresponding to the leaving message, the identifier of the device which has left and return an acknowledgment (BB-Ack) message to the BlueTooth device.

Step 708: Update device list information.

Specifically, according to the information of the leaving or the joining of the BlueTooth device, the M2M gateway updates the information of the topology management tree in FIG. 2, removes topology and service information related to the device which has left, and adds topology and service information related to the newly joined device.

Step 709: The M2M gateway sends a notification message (Alert: Topology Changed) to the DM server.

Specifically, according to the setting condition of the Topo/Operations/DiscTopoAndService/Notification node in step 702, the M2M gateway sends the DM notification message to the device management server, where <Alert> may be used to indicate that the notification is used for reporting a change of the sensor network topology information.

Step 710: Rediscover the BlueTooth network topology and service information of the BlueTooth device through the gateway.

Specifically, similar to step 706, the DM server further acquires, according to the notification in step 705, the updated BlueTooth sensor network topology information from the M2M gateway; or, similar to step 702 to step 706, the device management server executes the process of discovering sensor network topology information and device service information again.

In this embodiment, the DM server sends the DM command to the M2M gateway. The DM command acts on the MO information for discovering the BlueTooth network topology and the device service information, so as to conveniently implement the discovery of the BlueTooth network topology and the device service information.

A modification procedure includes removing a specified device, removing a specified device and a child device of the specified device, adding a specified device, and changing a topology connection relationship between a specified device and a neighbor device.

During the removal of a specified device, the receiving the DM command sent by the device management server includes: receiving a DM modification command sent by the device management server, where the DM modification command acts on the fifth MO node and the fifth MO node is specifically configured to remove the specified device from the sensor network; and the managing the sensor network according to the DM command includes: sending a removal command to the specified device, and updating the characteristic information of each sensor device and/or the topology connection relationship among the sensor devices in the second MO node, and/or, the information about a service provided by each sensor device in the third MO node.

During removal of a specified device and the child node thereof, the receiving the DM command sent by the device management server includes: receiving a DM modification command sent by the device management server, where the DM modification command acts on the fifth MO node and the fifth MO node is specifically configured to remove the specified device and the child node thereof from the sensor network; and the managing the sensor network according to the DM command includes: sending a removal command to the specified device, where the removal command includes indication information of removing the child device, and updating the characteristic information of each sensor device and/or the topology connection relationship among the sensor devices in the second MO node, and/or, the information about a service provided by each sensor device in the third MO node.

During the adding of a specified device, the receiving the DM command sent by the device management server includes: receiving a DM modification command sent by the device management server, where the DM modification command acts on the fifth MO node and the fifth MO node is specifically configured to add the specified device into the sensor network; and the managing the sensor network according to the DM command includes: sending a connection establishment request message to the specified device and updating the characteristic information of each sensor device and/or the topology connection relationship among the sensor devices in the second MO node, and/or, the information about a service provided by each sensor device in the third MO node.

During the changing of a topology connection relationship between a specified device and a neighbor device, the receiving the DM command sent by the device management server includes: receiving a DM modification command sent by the device management server, where the DM modification command acts on the fifth MO node and the fifth MO node is specifically configured to modify the topology connection relationship between the specified device and the neighbor device; and the managing the sensor network according to the DM command includes: permitting a specified neighbor device to admit a new child device, prohibiting other neighbor devices from admitting the child device, instructing the specified device to rejoin in the network, and updating the topology connection relationship among the sensor devices in the second MO node. Through the foregoing processing, the specified device is enabled to establish a connection relationship with the specified neighbor device and disconnect the connection relationships with other neighbor devices.

The topology information is modified in the foregoing, and service information may also be modified. At this time, the receiving the DM command sent by the device management server includes: receiving a DM modification command sent by the device management server, where the DM modification command acts on the sixth MO node. The managing the sensor network according to the DM command includes: modifying service information related to a specified sensor network device, including: modifying a group and/or binding relationship of a specified service, and updating the information about a service provided by a specified sensor device in the third MO node. The following provides an embodiment in the foregoing modification condition in combination with a specific sensor network.

After the above discovery procedure, or further after the modification procedure, the description nodes (the first MO node, the second MO node, and the third MO node) store corresponding information, and at this time, an acquisition procedure may be performed, so that the gateway sends the corresponding information to the device management server.

Specifically, the receiving the DM command sent by the device management server includes: receiving a DM get command sent by the device management server, where the DM get command acts on the first MO node. The managing the sensor network according to the DM command includes: sending the overall information of the sensor network stored in the first MO node to the device management server.

Alternatively, the receiving the DM command sent by the device management server includes: receiving a DM get command sent by the device management server, where the DM get command acts on the second MO node.

The managing the sensor network according to the DM command includes: sending the characteristic information of each sensor device and/or the information of the topology connection relationship among the sensor devices stored in the second MO node to the device management server.

Alternatively, the receiving the DM command sent by the device management server includes: receiving a DM get command sent by the device management server, where the DM get command acts on the third MO node. The managing the sensor network according to the DM command includes: sending the information about a service provided by each sensor device stored in the third MO node to the device management server.

Of course, in the acquisition procedure, the information acquired from the second MO node and/or the third MO node is the updated information if the updating is already performed, and otherwise the information is the information mapped and stored initially.

Some modification embodiments are provided in the following in combination with specific scenarios.

Figure 8:
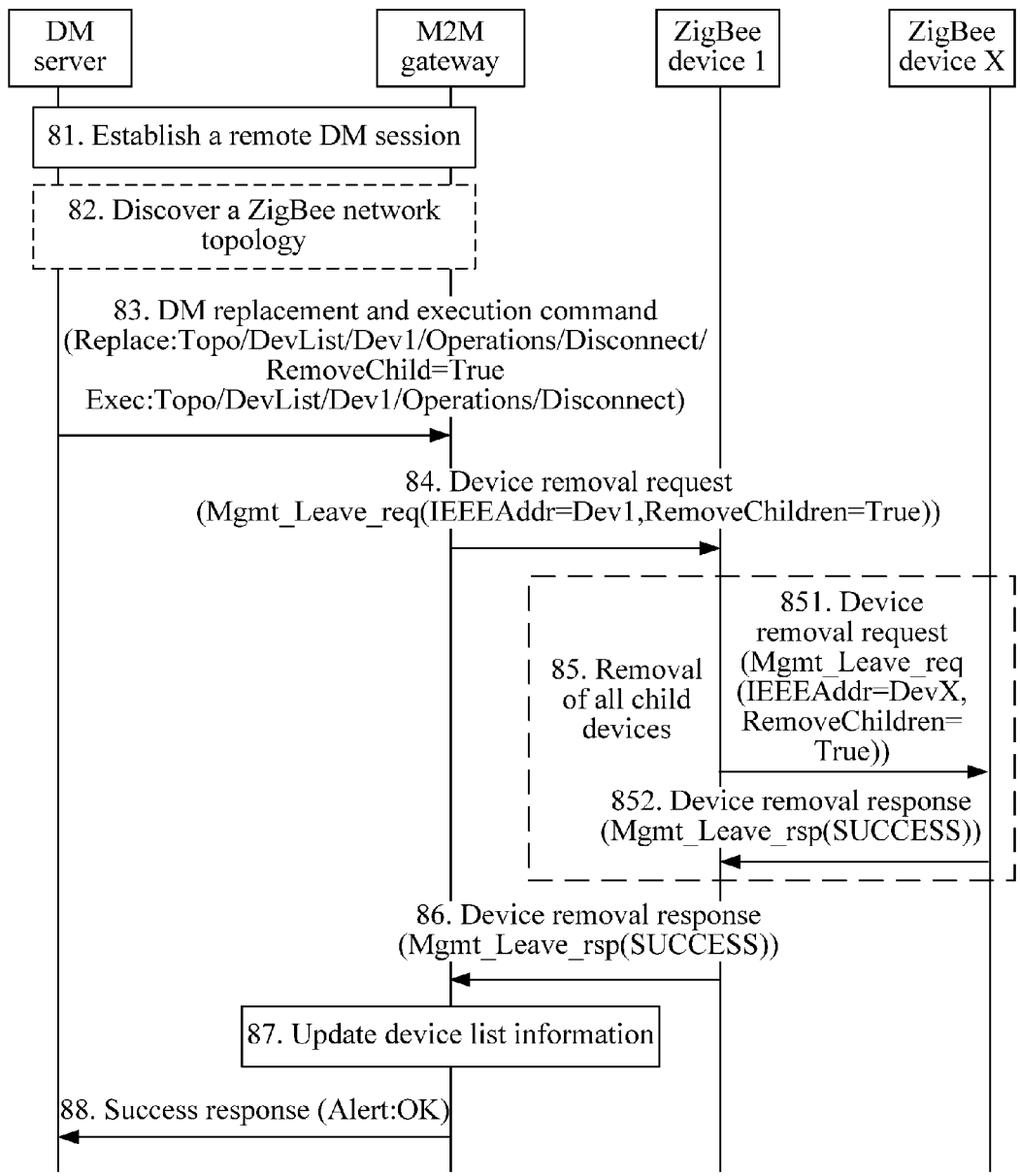
FIG. 8 is a schematic flow chart of a method according to Embodiment 5 of the present invention.

FIG. 8 is a schematic flow chart of a method according to Embodiment 5 of the present invention. This embodiment describes the removal of a ZigBee device and a related child device through a gateway. Referring to FIG. 8, this embodiment includes the following steps:

It is assumed that, in this embodiment, a removed ZigBee device 1 is associated with some child devices X.

Step 81: Establish a remote DM session.

For the specific content, refer to step 51.

Step 82: Discover a ZigBee network topology.

For the specific content, refer to step 52 to step 56.

Step 83: The DM server sends to the M2M gateway a DM replacement (Replace) command and a DM execution (Exec) command (Topo/DevList/Dev1/Operations/Disconnect/RemoveChildren=True and Exec:Topo/DevList/Dev1/Operations/Disconnect).

Specifically, if the device management server expects to remove the ZigBee device 1 (Dev1) and all child devices X (DevX) associated with the ZigBee device 1, the device management server first sends to the M2M gateway one DM replacement (Replace) command, which acts on the MO node Topo/DevList/Dev1/Operations/Disconnect/RemoveChildren corresponding to the device 1 defined in FIG. 2, where the value of the node is TRUE, and then the device management server sends to the M2M gateway one DM execution (Exec) command, which acts on a node Topo/DevList/Dev1/Operations/Disconnect. The M2M gateway parses the DM command and determines that it is necessary to remove the device 1 and all the associated child devices X in the current ZigBee network through a corresponding ZigBee protocol request.

Step 84: The M2M gateway sends to the ZigBee device 1 a device removal request (Mgmt_Leave_req). Where, the device removal request carries a network address (IEEEAddr=Dev1) of the ZigBee device 1 and a parameter RemoveChildren=TRUE for instructing the ZigBee device 1 to further remove all the child devices associated with the ZigBee device 1.

Step 85: Remove all the child devices, which includes the following steps:

Step 851: The ZigBee device 1 sends the device removal request (Mgmt_Leave_req) to all the child devices X associated with the ZigBee device 1, where, the device removal request carries network addresses of the devices X and parameters RemoveChildren=TRUE for instructing the devices X to further remove all child devices associated with the devices X.

Step 852: After the devices X remove all the child devices associated at a low layer to the devices X according to the same method, the devices X each return a device removal response (Mgmt_Leave_rsp) to the ZigBee device 1 and enable the devices X to leave the current ZigBee network, where, the device removal response which carries the success information (SUCCESS).

Step 86: The ZigBee device 1 sends the device removal response (Mgmt_Leave_rsp), which carries success information (SUCCESS), to the M2M gateway and enables the ZigBee device 1 to leave the current ZigBee network.

Step 87: The M2M gateway updates the device list information.

Specifically, according to the information of the network topology after the device is removed, the M2M gateway updates the information of the topology management tree in FIG. 2 and removes topology and service information related to the device which has left.

Step 88: The M2M gateway returns a success response (Alert:OK) to the DM server.

Specifically, the M2M gateway sends a DM response message to the DM server, where the carried element of <Alert>: OK indicates that a topology management function of removing the ZigBee device 1 and all the child devices associated with the ZigBee device 1 is successfully executed.

It should be noted that, if the device management server expects to remove only the ZigBee device 1 but not to remove all the child devices X (DevX) associated with the ZigBee device 1, in step 83, the value of the Topo/DevList/Dev1/Operations/Disconnect/RemoveChildren node is FALSE, or the node is not set, in step 84, the parameter RemoveChildren=FALSE, and it is unnecessary to execute step 85.

In this embodiment, the DM server sends a DM command to the M2M gateway. The DM command acts on MO information for removing a ZigBee device and associated child devices, so as to conveniently remove the ZigBee device and the associated child devices.

Figure 9:
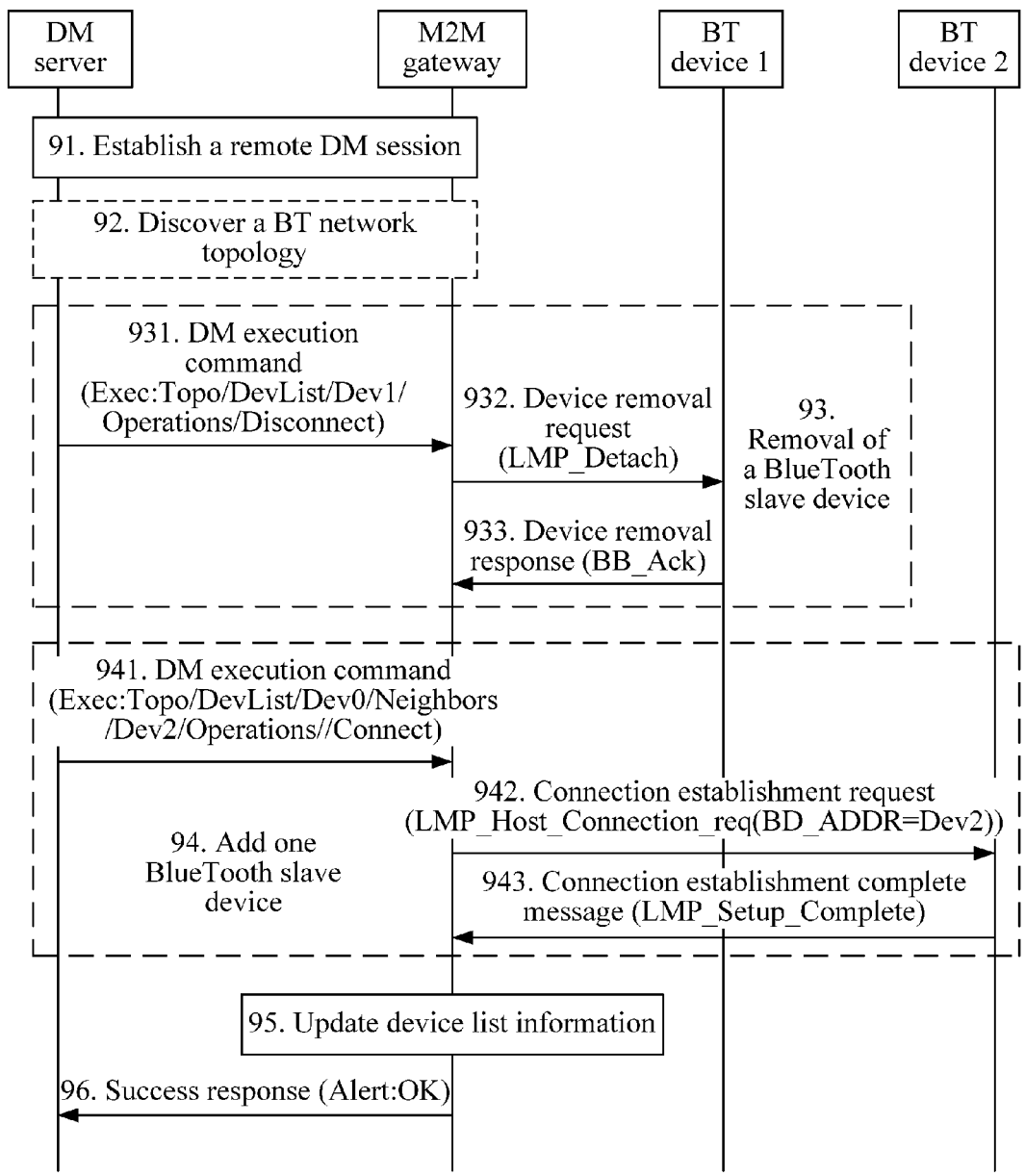
FIG. 9 is a schematic flow chart of a method according to Embodiment 6 of the present invention.

FIG. 9 is a schematic flow chart of a method according to Embodiment 6 of the present invention. This embodiment describes removal or adding of a BlueTooth slave device through a gateway. Referring to FIG. 9, this embodiment includes the following steps:

It is assumed that the M2M gateway (Dev0) serves as a master device (Master) in a BlueTooth network, a BlueTooth device 1 (Dev1) serves as a slave device (Slave), and a BlueTooth device 2 has not joined in the current BlueTooth network yet, but is turned on and in a working status to be discoverable by the M2M gateway.

Step 91: Establish a remote DM session.

For the specific content, refer to step 701.

Step 92: Discover a BT network topology.

For the specific content, refer to step 702 to step 706.

Step 93: Remove a BlueTooth slave device, which includes the following steps:

Step 931: The DM server sends a DM execution (Exec) command (Exec:Topo/DevList/Dev1/Operations/Disconnect) to the M2M gateway.

Specifically, according to a BlueTooth network topology discovery result in step 92, if the device management server expects to remove the BlueTooth slave device 1 (Dev1), the device management server sends to the M2M gateway one DM execution (Exec) command, which acts on an MO node Topo/DevList/Dev1/Operations/Disconnect corresponding to the device 1 defined in FIG. 2. The M2M gateway parses the DM command and determines that it is necessary to remove the device 1 in the current BlueTooth network according to a corresponding BlueTooth protocol request.

Step 932: The M2M gateway sends a device removal request (LMP_Detach) to the BlueTooth device 1.

Step 933: The BlueTooth device 1 sends a device removal response (BB_Ack) to the M2M gateway, where the acknowledgment of successful removal of the device is obtained through the response message.

Step 94: Add one BlueTooth slave device.

Step 941: The DM server sends a DM execution (Exec) command (Exec:Topo/DevList/Dev0/Neighbors/Dev2/Operations/Connect) to the M2M gateway.

Specifically, according to a BlueTooth network topology discovery result in step 92, if the device management server expects to add the BlueTooth device 2 (Dev2) as a slave device into the current BlueTooth network, the device management server sends to the M2M gateway one DM execution (Exec) command, which acts on an MO node Topo/DevList/Dev0/Neighbors/Dev2/Connect defined in FIG. 2. The M2M gateway parses the DM command and determines that it is necessary to add a neighbor BlueTooth device 2 discovered by the M2M gateway as a slave device into the current BlueTooth network through a corresponding BlueTooth protocol request.

Step 942: The M2M gateway (that is, the master device 0 of the BlueTooth network) sends a connection establishment request (LMP_Host_Connection_req), which carries a network address (BD_ADDR=Dev2) of the device 2, to the BlueTooth device 2.

Step 943: If the device 2 agrees to join in the current BlueTooth network, the device 2 returns a connection establishment complete message LMP_Setup_Complete to the M2M gateway to acknowledge that the device 2 has joined in the current BlueTooth network.

Step 95: The M2M gateway updates device list information.

Specifically, according to the condition of the network topology after the device is removed or added, the M2M gateway updates the information of the topology management tree shown in FIG. 2, that is, removes topology and service information related to the device which has left, and adds topology and service information related to the newly joined device.

Step 96: The M2M gateway returns a success response (Alert:OK) to the DM server.

Specifically, the M2M gateway sends a DM response message to the device management server, where the carried <Alert> element indicates that the topology management function of removing or adding a BlueTooth device is successfully executed.

It should be noted that:

step 93 and step 94 are operation steps independent from each other, so step 95 and step 96 may occur after step 93, and also may occur after step 94.

In this embodiment, the DM server sends a DM command to the M2M gateway. The DM command acts on MO information for removing or adding a BlueTooth slave device, so as to conveniently implement the removal or adding of a BlueTooth slave device.

Figure 10:
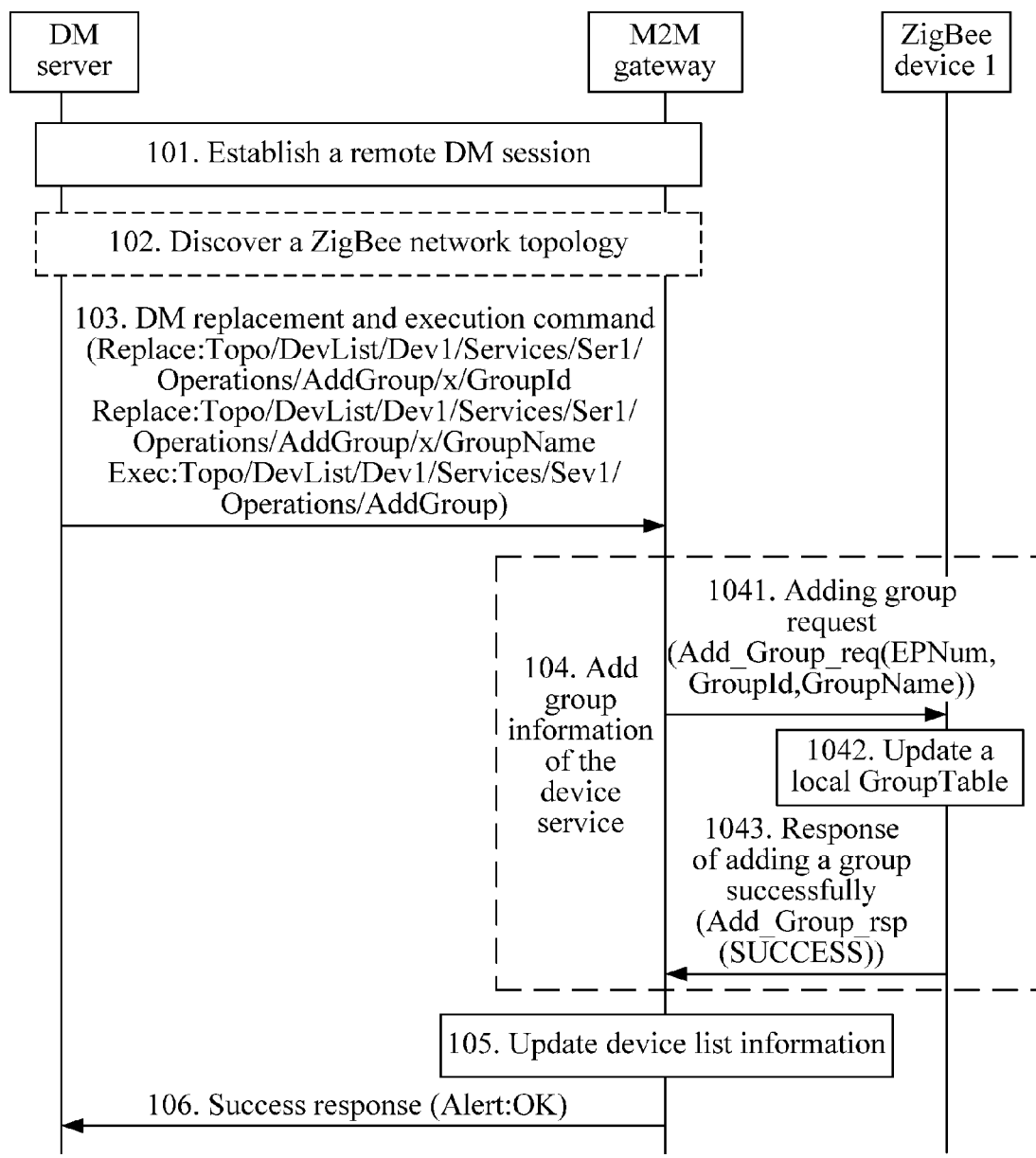
FIG. 10 is a schematic flow chart of a method according to Embodiment 7 of the present invention.

FIG. 10 is a schematic flow chart of a method according to Embodiment 7 of the present invention. This embodiment describes remote modification of service information of a ZigBee device through a gateway. Referring to FIG. 10, this embodiment includes the following steps:

Since a ZigBee network supports the function of remote service configuration, a device management server can remotely modify, through an M2M gateway, service information of a specified ZigBee device according to an MO management tree shown in FIG. 3. The service information includes information of a group where a service is located and binding information related to the service. This embodiment only takes the modification of the group information as example. The operation method of modifying the binding information related to the service is similar, which is not described again.

Step 101: Establish a remote DM session.

For the specific content, refer to step 51.

Step 102: Discover a ZigBee network topology.

For the specific content, refer to step 52 to step 56.

Step 103: The DM server sends to the M2M gateway a DM replacement (Replace) command and a DM execution (Exec) command (Replace:Topo/DevList/Dev1/Services/Sev1/Operations/AddGroup/<x>/GroupId;
Replace:Topo/DevList/Dev1/Services/Sev1/Operations/AddGroup/<x>/GroupName; and
Exec:Topo/DevList/Dev1/Services/Sev1/Operations/AddGroup).

Specifically, according to the result of discovering the ZigBee network topology and the device service information in step 102, if the device management server expects to add information of a group where a service 1 (Sev1) of a device 1 (Dev1) is located for the service 1 and the device 1, the device management server first sends to the M2M gateway two DM replacement (Replace) commands, which act on an MO node Topo/DevList/Dev1/Services/Sev1/Operations/AddGroup/<x>/GroupId and an MO node Topo/DevList/Dev1/Services/Sev1/Operations/AddGroup/<x>/GroupName defined in FIG. 2 and FIG. 3 respectively and are configured to set a group identifier and a group name to be added. If multiple pieces of group information expect to be added, the adding can be implemented through setting GroupId nodes and GroupName nodes under the plurality of <x> nodes. Then the device management server again sends to the M2M gateway one DM execution (Exec) command, which acts on an MO node Topo/DevList/Dev1/Services/Sev1/Operations/AddGroup. The M2M gateway parses the DM command and determines that it is necessary to add corresponding group information for the service 1 on the ZigBee device 1 through a corresponding ZigBee protocol request.

Step 104: Add group information of the device service, which includes the following steps:

Step 1041: The M2M gateway sends to the ZigBee device an add group request (Add_Group_req), which carries a sequence number of an EndPoint where the service 1 on the device 1 is located and the configured group identifier (GroupId) and the group name (GroupName) to be added.

Specifically, the M2M gateway first acquires, according to the management tree defined in FIG. 3, a sequence number of the EndPoint (EPNum) where the service 1 on the device 1 is located, and then sends to the ZigBee device 1 an add group request Add_Group_req, which carries the sequence number of the EndPoint where the service 1 on the device 1 is located and the configured group identifier (GroupId) and the group name (GroupName) to be added. The device 1 updates, according to the request, group table information related to a local service, and then returns a response of adding a group successfully to the M2M gateway.

Step 1042: The ZigBee device updates a local group table (GroupTable).

Step 1043: The ZigBee returns a response of adding a group successfully (Add_Group_rsp(SUCCESS)) to the M2M gateway.

Step 105: The M2M gateway updates group information of a corresponding device.

Specifically, the M2M gateway updates the information of the topology management tree shown in FIG. 2 and FIG. 3, that is, adds the group information of the service 1 on the device 1.

Step 106: The M2M gateway returns a success response (Alert:OK) to the DM server.

Specifically, the M2M gateway sends a DM response message to the device management server, where the carried <Alert> element indicates that a topology management function of modifying the device service information is successfully executed.

It should be noted that:

if a remote device management server needs to modify other service information on a specified ZigBee device, in step 103, the remote device management server send, according to the information of the topology management tree shown in FIG. 3, to the M2M gateway a replacement (Replace) command and an execution (Exec) command which act on corresponding MO nodes, that is, instruct the M2M gateway to execute corresponding management operation of modifying the device service information, for example, add service binding information through Exec Topo/DevList/Dev1/Services/Sev1/Operations/Bind and remove group information through Exec Topo/DevList/Dev1/Services/Sev1/Operations/RemoveAllGroups or Exec Topo/DevList/Dev1/Services/Sev1/Groups/<x>/Remove.

In this embodiment, the DM server sends a DM command to the M2M gateway. The DM command acts on MO information for remotely modifying the service information of the ZigBee device, so as to conveniently implement the remote modification of the service information of the ZigBee device.

Figure 11A:
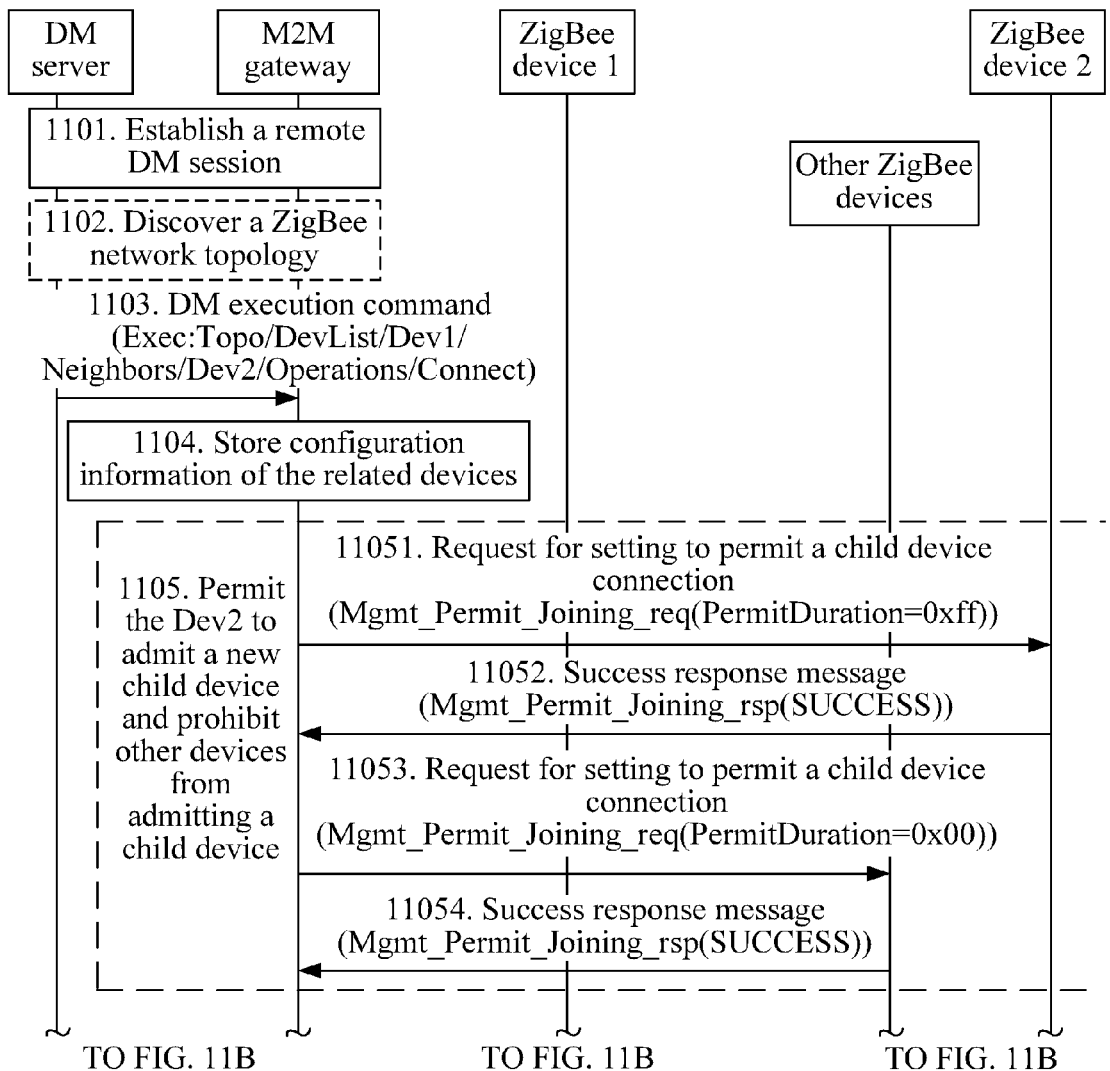
FIG. 11A and FIG. 11B is a schematic flow chart of a method according to Embodiment 8 of the present invention.
Figure 11B:
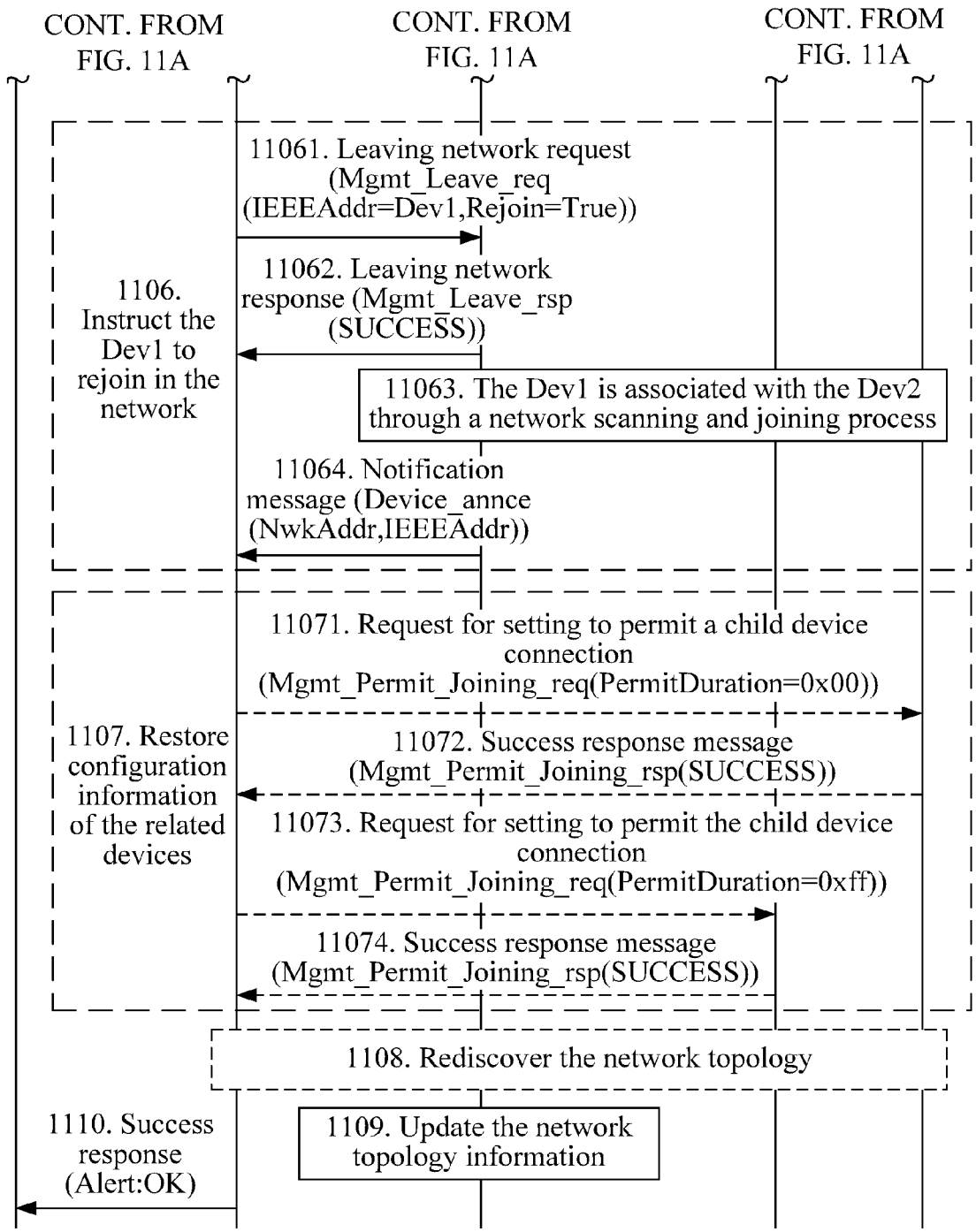

FIG. 11A and FIG. 11B a schematic flow chart of a method according to Embodiment 8 of the present invention. This embodiment describes the modification of a topology connection relationship among ZigBee devices through a gateway. Referring to FIG. 11A and FIG. 11B, this embodiment includes the following steps:

It is assumed in this embodiment that a ZigBee device 1 is originally connected to a device 3 which is a parent device of the ZigBee device 1 and then expects to be connected to a device 2 serving as a parent device of the ZigBee device 1.

Step 1101: Establish a remote DM session.

For the specific content, refer to step 51.

Step 1102: Discover a ZigBee network topology.

For the specific content, refer to step 52 to step 56.

It is assumed that, at this time, a device management server discovers that the ZigBee device 1 (Dev1) is already connected to the neighbor parent device 3 (Dev3) (a neighbor relationship is: Relationship=Parent) and the neighbor device 2 (Dev2) also presents around that may serve as the parent device to be connected to the ZigBee device 1 (a neighbor relationship is: Relationship=None).

Step 1103: The DM server sends a DM execution (Exec) command (Exec:Topo/DevList/Dev1/Neighbors/Dev2/Operations/Connect) to the M2M gateway.

Specifically, if the device management server expects to move the connection of the ZigBee device 1 (Dev1) from the current parent device 3 (Dev3) to the device 2 (Dev2), the device management server sends to the M2M gateway one DM execution (Exec) command, which acts on an MO node Topo/DevList/Dev1/Neighbors/Dev2/Operations/Connect corresponding to the device 1 defined in FIG. 2. The M2M gateway parses the DM command and determines that it is necessary to remove the ZigBee device 1 from the current parent device 3 (Dev3) and then reconnect the ZigBee device 1 to the parent device 2 (Dev2) according to a corresponding ZigBee protocol request.

Step 1104: The M2M gateway stores configuration information of the related devices.

Specifically, since the establishment of connections among the devices in the ZigBee network is completed in a self-organized manner and the ZigBee protocol does not directly provide an operation method for establishing a connection between one ZigBee device (Dev1) and a specified parent device (Dev2), an intermediate operation is required to implement the establishment of the connection. The specific method is: first disabling the function of permitting child device connection (modifying a parameter of PermitDuration to be 0x00) of all other ZigBee devices around the Dev1 device other than the Dev2; and then instructing the Dev1 to leave the current ZigBee network and rejoin in the network again, at this time, through the process of spontaneously joining in a network, the Dev1 only can choose the Dev2 as the parent device to establish a connection, so as to achieve an expected effect of modifying the topology. In order to ensure the working status of the devices in the ZigBee network to be consistent with the working status before the topology is modified, it is necessary to store related parameters of the devices, for example, PermitDuration.

Step 1105: Permit the Dev2 to admit a new child device and prohibit other device from admitting the child device, which includes the following steps:

Step 11051: The M2M gateway sends a request for setting to permit a child device connection (Mgmt_Permit_Joining_req) to a neighbor device (for example, the ZigBee device 2) of the ZigBee device 1 (Dev1). For the device 2 (Dev2), a carried parameter PermitDuration=0xff indicates that the child device connection is permitted.

Step 11052: The ZigBee device 2 sends a success response message (Mgmt_Permit_Joining_rsp(SUCCESS)) to the M2M gateway to acknowledge the completion of setting.

Step 11053: The M2M gateway sends the request for setting to permit the child device connection (Mgmt_Permit_Joining_req) to a neighbor device (for example, other ZigBee devices) of the ZigBee device 1 (Dev1). For other neighbor devices, a carried parameter PermitDuration=0x00 indicates that the child device connection is not permitted.

Step 11054: The other ZigBee devices send a success response message (Mgmt_Permit_Joining_rsp(SUCCESS)) to the M2M gateway to acknowledge the completion of setting.

Step 1106: Instruct the Dev1 to rejoin in the network. Specifically, the ZigBee device 1 leaves the current network according to the request and then executes the process of spontaneous network scanning and joining. Since only the neighbor device 2 (Dev2) permits the device 1 to join in the network at this time, the device 1 (Dev1) only can use the device 2 (Dev2) as the parent device thereof to establish a connection and then notifies, through a device announcement request Device_annce, the M2M gateway that the device 1 has rejoined in the network. Step 1106 includes the following steps:

Step 11061: The M2M gateway sends a leaving network request (Mgmt_Leave_req) to the ZigBee device 1 (Dev1), where a carried IEEEAddr parameter indicates the identifier of the device 1, and at the same time, a carried parameter Rejoin=True indicates that the device 1 further needs scanning and rejoining after leaving the network.

Step 11062: The ZigBee device 1 sends to the M2M gateway a leaving network response (Mgmt_Leave_rsp), which carries a SUCCESS parameter.

Step 11063: The ZigBee device 1 (Dev1) is associated with the ZigBee device 2 (Dev2) through a network scanning and joining process.

Step 11064: The ZigBee device 1 sends to the M2M gateway a notification message (Device_annce), which carries a network address (NwkAddr) and an IEEE address (IEEEAddr).

Step 1107: If a change occurs, restore configuration information of the related devices. Specifically, if the configuration parameter of permitting the child device connection of the neighbor device of the device 1 (Dev1) is modified in step 1105, as compared with step 1104, at this time, the gateway needs to restore the configuration parameter stored in step 1104 to the corresponding device through a method similar to that in step 1105. Step 1107 includes the following steps:

Step 11071: The M2M gateway sends to the ZigBee device 2 the request for setting to permit the child device connection (Mgmt_Permit_Joining_req), which carries a parameter PermitDuration=0x00, indicating that the child device connection is not limited.

Step 11072: The ZigBee device 2 sends a success response message (Mgmt_Permit_Joining_rsp(SUCCESS)) to the M2M gateway to acknowledge the completion of setting.

Step 11073: The M2M gateway sends to other ZigBee devices the request for setting to permit the child device connection (Mgmt_Permit_Joining_req), which carries the parameter PermitDuration=0xff, indicating that the child device connection is permitted.

Step 11074: Other ZigBee devices send a success response message (Mgmt_Permit_Joining_rsp(SUCCESS)) to the M2M gateway to acknowledge the completion of setting.

Step 1108: Optionally, rediscover the network topology.

Specifically, optionally, the M2M gateway may execute a process from step 3 to step 9 in Embodiment 1 to rediscover the topology information of the current ZigBee network and the device service information, so as to guarantee the accuracy of related information.

Step 1109: The M2M gateway updates the network topology information.

Specifically, according to the changed topology connection relationship, the M2M gateway updates the information of the topology management trees shown in FIG. 6 and FIG. 7A and FIG. 7B.

Step 1110: The M2M gateway returns a success response (Alert:OK) to the DM server.

Specifically, the M2M gateway sends a DM response message to the device management server, where the carried <Alert> element indicates that a topology management function of modifying the device service information is successfully executed.

In this embodiment, the DM server sends a DM command to the M2M gateway. The DM command acts on MO information for modifying the topology connection relationship among the ZigBee devices, so as to conveniently implement the modification of the topology connection relationship among the ZigBee devices.

Figure 12:
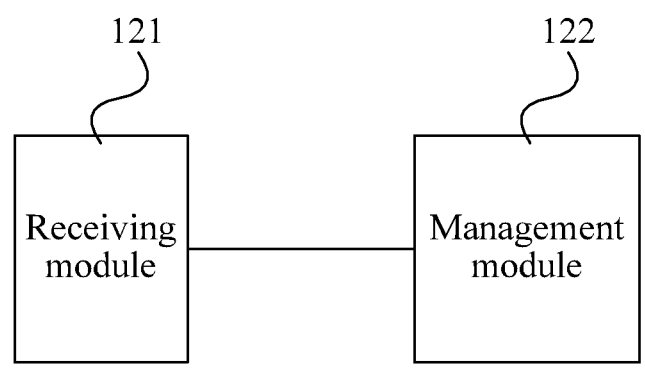
FIG. 12 is a schematic structural diagram of a gateway according to Embodiment 9 of the present invention.

FIG. 12 is a schematic structural diagram of a gateway according to Embodiment 9 of the present invention. The gateway includes a receiving module 121 and a management module 122. The receiving module 121 is configured to receive a DM command sent by a device management server. The DM command acts on a preconstructed MO node. The MO node includes a node configured to discover a sensor network topology, a node configured to describe a sensor network topology, or a node configured to modify a sensor network topology.

The management module 122 is configured to manage a sensor network according to the DM command. The management includes discovering the sensor network topology, describing the sensor network topology, or modifying the sensor network topology.

The node configured to describe a sensor network topology includes at least one of: a first MO node configured to describe the overall information of the sensor network, a second MO node configured to describe characteristic information of each sensor device and/or information of a topology connection relationship among the sensor devices, and a third MO node configured to describe information about a service provided by each sensor device;

and/or, the node configured to discover the sensor network topology includes: a fourth MO node configured to discover the topology connection relationship among the sensor devices and/or the information about a service provided by each sensor device;

and/or, the node configured to modify a sensor network topology includes at least one of: a fifth MO node configured to modify the topology connection relationship among the sensor devices and a sixth MO node configured to modify the information about a service provided by the sensor device.

Specifically, the receiving module 121 is specifically configured to receive a DM discovery command sent by the device management server, where the DM discovery command acts on the fourth MO node. The management module 122 is specifically configured to discover the topology, and map and store the topology to the second MO node. The topology discovery includes at least one of: searching for the information of an identifier and an address of a device, searching for additional information of the device, searching for information of an associated device, searching for information of a connection status among the devices, and/or, discovering service, and mapping and storing the service to the third MO node. The service discovery includes at least one of: searching for device service information, searching for group information related to the service of the device, and searching for binding information among the service of the device. Furthermore, the management module 122 is further configured to: detect joining or leaving of the sensor device in or from the sensor network, update, according to a detected condition of the joining or leaving of the sensor device, the characteristic information of each sensor device and/or the topology connection relationship among the sensor devices in the second MO node, and/or, the information about a service provided by each sensor device in the third MO node, and report a notification message to the device management server.

Alternatively, the receiving module 121 is specifically configured to receive a DM modification command sent by the device management server, where the DM modification command acts on the fifth MO node and the fifth MO node is specifically configured to remove a specified device from the sensor network; and the management module 122 is specifically configured to send a removal command to the specified device and update the characteristic information of each sensor device and/or the topology connection relationship among the sensor devices in the second MO node, and/or, the information about a service provided by each sensor device in the third MO node.

Alternatively, the receiving module 121 is specifically configured to receive a DM modification command sent by the device management server, where the DM modification command acts on the fifth MO node and the fifth MO node is specifically configured to remove a specified device and a child device of the specified device from the sensor network; and the management module 122 is specifically configured to send a removal command to the specified device, where the removal command includes indication information of removing the child device, and update the characteristic information of each sensor device and/or the topology connection relationship among the sensor devices in the second MO node, and/or, the information about a service provided by each sensor device in the third MO node.

Alternatively, the receiving module 121 is specifically configured to receive a DM modification command sent by the device management server, where the DM modification command acts on the fifth MO node and the fifth MO node is specifically configured to add a specified device into the sensor network; and the management module 122 is specifically configured to send a connection establishment request message to the specified device and update the topology connection relationship among the sensor devices in the second MO node, and/or, the information about a service provided by each sensor device in the third MO node.

Alternatively, the receiving module 121 is specifically configured to receive a DM modification command sent by the device management server, where the DM modification command acts on the fifth MO node and the fifth MO node is specifically configured to modify a topology connection relationship between a specified device and a neighbor device; and the management module 122 is specifically configured to permit a specified neighbor device to admit a new child device and prohibit other neighbor devices from admitting the child device, instruct the specified device to rejoin in the network, and update the topology connection relationship among the sensor devices in the second MO node.

Alternatively, the receiving module 121 is specifically configured to receive a DM modification command sent by the device management server, where the DM modification command acts on the sixth MO node; and the management module 122 is specifically configured to modify related service information of a specified sensor network device, including: modifying a group and/or binding relationship of a specified service and update information about a service provided by a specified sensor device in the third MO node.

Alternatively, the receiving module 121 is specifically configured to receive a DM get command sent by the device management server, where the DM get command acts on the first MO node. The management module 122 is specifically configured to send the overall information of the sensor network stored in the first MO node to the device management server.

Alternatively, the receiving module 121 is specifically configured to receive a DM get command sent by the device management server, where the DM get command acts on the second MO node; and the management module 122 is specifically configured to send the characteristic information of each sensor device and/or the information of the topology connection relationship among the sensor devices stored in the second MO node to the device management server.

Alternatively, the receiving module 121 is specifically configured to receive a DM get command sent by the device management server, where the DM get command acts on the third MO node; and the management module 122 is specifically configured to send the information about a service provided by each sensor device stored in the third MO node to the device management server.

In this embodiment, a DM command is received through information of a preconstructed topology and a uniform management interface (that is, a DM protocol interface) consistent with existing remote device management technologies is used, so that an M2M service platform (or other device management servers) can perform remote topology management and maintenance not only on the M2M gateway, but also on a sensor network successive to the M2M gateway, thereby reducing the complexity of implementing the management.

It may be understood that, related features in the method and device may be referenced mutually. In addition, "first" and "second" in the preceding embodiments are configured to distinguish embodiments, but do not represent superiority or inferiority of all embodiments.

Persons of ordinary skill in the art should understand that all or part of the steps of the method specified in any embodiment of the present invention may be implemented by a program instructing relevant hardware. The program may be stored in a computer readable storage medium. When the program is run, the program executes the steps of the method specified in any embodiment above. The storage medium may be any medium capable of storing program codes, such as ROM, RAM, magnetic disk, or optical disk.

Finally, it should be noted that the above embodiments of the present invention are merely intended for describing the technical solutions of the present invention other than limiting the present invention. Although the present invention is described in detail with reference to the foregoing embodiments, persons of ordinary skill in the art should understand that they can still make modifications to the technical solution described in the foregoing embodiments or make equivalent substitutions to some technical features thereof, without departing from the spirit and scope of the technical solution of the embodiments of the present invention.

What is claimed is:

1. In a Machine to Machine (M2M) gateway, a method for remotely managing a sensor network topology, comprising:
    receiving a first and second device management (DM) commands from a device management server via a first network, wherein the M2M gateway connects the device management server to at least two sensor devices within a sensor network different from the first network;
    upon receiving the first or second DM command, accessing a topology tree that includes two or more management object (MO) nodes, which describe and represent a sensor network topology relative to the M2M gateway including a connectional relationship between the at least two sensor devices within the sensor network, and wherein a first of the two or more MO nodes includes an identification and type of the sensor network and a second of the at least two or more MO nodes describes at least one characteristic of each of the at least two sensor devices and a connectional relationship between them;
    based on an address within the first DM command and information within the first MO node, retrieving first information from the topology tree including the identification and type of the sensor network;
    based on an address within the second DM command and information within the second MO node, retrieving second information from the topology tree including the characteristic of the at least two sensor devices and the connectional relationship between the at least two sensor devices; and
    sending the retrieved first and second information to the device management server.

2. The method according to claim 1, wherein a third and a fourth of the two or more MO nodes are configured to discover at least one of: the topology connection relationship among the sensor devices or the information about a service provided by each sensor device; and wherein the method further comprises:
    based on an address within a third DM command and information within the fourth MO node, searching for at least one of: an identifier and an address of a device, additional information of the device, information of an associated device, or information of a connection status among the devices; and
    mapping and storing the searched information to the second MO node; or searching for at least one of: device service information, group information related to the service of a device, and binding information among the service of a device; and
    mapping and storing the searched information to the third MO node.

3. The method according to claim 1, the wherein the two or more MO nodes further comprises: at least one of: a fifth MO node, configured to modify the topology connection relationship among the sensor devices; and a sixth MO node, configured to modify the information about a service provided by the sensor device.

4. The method according to claim 2, wherein the fourth MO node further comprises a child MO node configured to instruct reporting of a subsequent topology change; and wherein based on an address within a fourth DM command and information within a child MO node of the fourth MO node, the method further comprises:
  detecting joining or leaving of a sensor device in or from the sensor network;
  updating at least one of, according to the detected result, the characteristic information of each sensor device, the topology connection relationship among the sensor devices in the second MO node, and the information about a service provided by each sensor device in the third MO node; and
  reporting a notification message to the device management server.

5. The method according to claim 3, wherein, the method further comprises:
  receiving a DM modification command sent by the device management server, wherein the DM modification command comprises the address of the fifth MO node, and the fifth MO node is configured to remove a device the fifth MO node specified from the sensor network;
  sending a removal command to the specified device; and
  updating at least one of: the characteristic information of each sensor device, the topology connection relationship among the sensor devices in the second MO node, and, the information about a service provided by each sensor device in the third MO node.

6. The method according to claim 3, wherein the method further comprises:
  receiving a DM modification command sent by the device management server, wherein the DM modification command comprises the address of the fifth MO node and the fifth MO node is configured to remove a device the fifth MO node specified and a child device of the device the fifth MO node specified from the sensor network;
  sending a removal command to the device the fifth MO node specified, wherein the removal command comprises indication information of removing the child device; and
  updating at least one of: the characteristic information of each sensor device, the topology connection relationship among the sensor devices in the second MO node, and, the information about a service provided by each sensor device in the third MO node.

7. The method according to claim 3, wherein the method further comprises:
  receiving a DM modification command sent by the device management server, wherein the DM modification command comprises the address of the fifth MO node and the fifth MO node is configured to add a device the fifth MO node specified into the sensor network;
  sending a connection establishment request message to the specified device; and
  updating at least one of: the characteristic information of each sensor device, the topology connection relationship among the sensor devices in the second MO node, and, the information about a service provided by each sensor device in the third MO node.

8. The method according to claim 3, wherein the method further comprises:
  receiving a DM modification command sent by the device management server, wherein the DM modification command comprises the address of the fifth MO node and the fifth MO node is configured to modify a topology connection relationship between a device the fifth MO node specified and a neighbor device;
  permitting a neighbor device to admit a new child device and prohibiting other neighbor device from admitting a child device; and
  instructing the device the fifth MO node specified to rejoin in the network and updating the topology connection relationship among the sensor devices in the second MO node.

9. A computer program product comprising computer executable instructions stored on a non-transitory computer readable medium such that when the computer executable instructions are executed by a computer program processor of a Machine to Machine (M2M) gateway to implement remotely managing a sensor network topology that:
  receiving a first and second device management (DM) commands from a device management server via a first network, wherein the M2M gateway connects the device management server to at least two sensor devices within a sensor network different from the first network;
  upon receiving the first or second the DM command, accessing a topology tree that includes two or more management object (MO) nodes, which describe and represent a sensor network topology relative to the M2M gateway including a connectional relationship between the at least two sensor devices within the sensor network, and wherein a first of the two or more MO nodes includes an identification and type of the sensor network and a second of the at least two or more MO nodes describes at least one characteristic of each of the at least two sensor devices and a connectional relationship between them;
  based on an address within the first DM command and information within the first MO node, retrieving first information from the topology tree including the identification and type of the sensor network;
  based on an address within the second DM command and information within the second MO node, retrieving information from the topology tree including about the characteristic of the at least two sensor devices and the connectional relationship between the at least two sensor devices; and
  sending the retrieved first and second information to the device management server.

10. The computer program product of claim 9, wherein the topology tree further includes a third MO node configured to describe information about a service provided by each sensor device, and a fourth MO node configured to discover at least one of: the topology connection relationship among the sensor devices or the information about a service provided by each sensor device, and further comprising computer executable instructions that when executed cause the M2M gateway to perform the following:
  based on an address within a third DM command and information within the fourth MO node,
  search for one or more of an identifier and an address of a device, additional information of the device, information of an associated device, information of a connection status among the devices; and map and store the searched information to the second MO node; or, search for one or more of device service information, group information related to the service of a device, and-binding information among the service of a device; and mapping and storing the searched information to a third MO node of the two or more MO nodes.

11. The computer program product of claim 9, wherein the topology tree further a fifth MO node, configured to modify the topology connection relationship among the sensor devices; and a sixth MO node, configured to modify the information about a service provided by the sensor device.

12. The computer program product of claim 10, wherein the fourth MO node further comprises a child MO node configured to instruct reporting of a subsequent topology change, and further comprising computer executable instructions that when executed cause the M2M gateway to perform the following:
based on an address within a fourth DM command and information within a child MO node of the fourth MO node; detect joining or leaving of a sensor device in or from the sensor network;
update at least one of, according to the detected result, the characteristic information of each sensor device, the topology connection relationship among the sensor devices in the second MO node, and, the information about a service provided by each sensor device in the third MO node; and
reporting a notification message to the device management server.

13. The computer program product of claim 11, wherein computer program product further comprising computer executable instructions that when executed cause the M2M gateway to perform the following:
receive a DM modification command sent by the device management server, wherein the DM modification command comprises the address of the fifth MO node, and the fifth MO node is specifically configured to remove a device the fifth MO node specified from the sensor network;
send a removal command to the specified device; and
update at least one of: the characteristic information of each sensor device, the topology connection relationship among the sensor devices in the second MO node, and, the information about a service provided by each sensor device in the third MO node.

14. The computer program product of claim 11, wherein computer program product further comprising computer executable instructions that when executed cause the M2M gateway to perform the following:
receive a DM modification command sent by the device management server, wherein the DM modification command comprises the address of the fifth MO node and the fifth MO node is configured to remove a device the fifth MO node specified and a child device of the device the fifth MO node specified from the sensor network;
send a removal command to the device the fifth MO node specified, wherein the removal command comprises indication information of removing the child device; and
update at least one of: the characteristic information of each sensor device, the topology connection relationship among the sensor devices in the second MO node, and the information about a service provided by each sensor device in the third MO node.

15. The computer program product of claim 11, wherein computer program product further comprising computer executable instructions that when executed cause the M2M gateway to perform the following:
receive a DM modification command sent by the device management server, wherein the DM modification command comprises the address of the fifth MO node and the fifth MO node is configured to add a device the fifth MO node specified into the sensor network;
send a connection establishment request message to the specified device; and
update at least one of: the characteristic information of each sensor device, the topology connection relationship among the sensor devices in the second MO node, and the information about a service provided by each sensor device in the third MO node.

16. The computer program product of claim 11, wherein computer program product further comprising computer executable instructions that when executed cause the M2M gateway to perform the following:
receive a DM modification command sent by the device management server, wherein the DM modification command comprises the address of the fifth MO node and the fifth MO node is configured to modify a topology connection relationship between a device the fifth MO node specified and a neighbor device;
permit a neighbor device to admit a new child device and prohibiting other neighbor device from admitting a child device; and
instruct the device the fifth MO node specified to rejoin in the network and updating the topology connection relationship among the sensor devices in the second MO node.

* * * * *